United States Patent
Lee et al.

(10) Patent No.: US 10,805,768 B2
(45) Date of Patent: Oct. 13, 2020

(54) METHOD AND APPARATUS FOR TRACKING LOCATION USING V2X COMMUNICATION IN A WIRELESS COMMUNICATION SYSTEM

(71) Applicant: LG ELECTRONICS INC., Seoul (KR)

(72) Inventors: Ki-Dong Lee, Seoul (KR); Sanggook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/081,379

(22) PCT Filed: Feb. 24, 2017

(86) PCT No.: PCT/KR2017/002091
§ 371 (c)(1),
(2) Date: Aug. 30, 2018

(87) PCT Pub. No.: WO2017/146534
PCT Pub. Date: Aug. 31, 2017

(65) Prior Publication Data
US 2019/0075447 A1    Mar. 7, 2019

Related U.S. Application Data

(60) Provisional application No. 62/299,523, filed on Feb. 24, 2016.

(51) Int. Cl.
*H04W 24/00*    (2009.01)
*H04W 4/029*    (2018.01)
(Continued)

(52) U.S. Cl.
CPC .......... *H04W 4/029* (2018.02); *H04W 4/40* (2018.02); *H04W 4/44* (2018.02); *H04W 4/46* (2018.02);
(Continued)

(58) Field of Classification Search
CPC . H04W 4/029; H04W 68/02; H04W 52/0277; H04W 8/26; H04W 4/40; H04W 8/20; H04W 4/44; H04W 4/46
See application file for complete search history.

(56) References Cited

U.S. PATENT DOCUMENTS 8,718,675 B1 *  5/2014  Choi .................. H04W 68/02
                                                    455/456.1
2003/0190921 A1 * 10/2003  Stewart .............. H04W 4/029
                                                    455/456.3
(Continued)

FOREIGN PATENT DOCUMENTS

KR    101585207    1/2016

OTHER PUBLICATIONS

European Patent Office Application Serial No. 17756871.4, Search Report dated May 14, 2019, 9 pages.
(Continued)

*Primary Examiner* — Edan Orgad
*Assistant Examiner* — Malick A Sohrab
(74) *Attorney, Agent, or Firm* — Lee Hong Degerman Kang Waimey

(57) ABSTRACT

Disclosed herein is a method for tracking a location in vehicle-to-X (V2X) communication in a wireless communication system. The method includes receiving a second message from a second network entity, checking whether the second vehicle UE is served by a cellular network, identifying its own ID included in the received second message, and transmitting a third message including second control (Continued)

information related to the location of the second vehicle UE to the second network entity if the second vehicle UE is served by the cellular network.

13 Claims, 14 Drawing Sheets

(51) Int. Cl.
    *H04W 4/46*    (2018.01)
    *H04W 4/44*    (2018.01)
    *H04W 8/20*    (2009.01)
    *H04W 4/40*    (2018.01)
    *H04W 8/26*    (2009.01)
    *H04W 52/02*    (2009.01)
    *H04W 68/02*    (2009.01)

(52) U.S. Cl.
    CPC ............... *H04W 8/20* (2013.01); *H04W 8/26* (2013.01); *H04W 52/0277* (2013.01); *H04W 68/02* (2013.01)

(56) References Cited

U.S. PATENT DOCUMENTS

| | | | |
|---|---|---|---|
| 2005/0020242 A1* | 1/2005 | Holland | G01S 5/0027 455/404.2 |
| 2006/0142913 A1* | 6/2006 | Coffee | B28C 5/422 701/29.3 |
| 2007/0015548 A1* | 1/2007 | Flick | G08G 1/20 455/569.2 |
| 2012/0089319 A1 | 4/2012 | Basnayake | |
| 2013/0079040 A1* | 3/2013 | Charbit | H04W 68/00 455/458 |
| 2013/0294366 A1* | 11/2013 | Papasakellariou | H04W 72/0406 370/329 |
| 2014/0073326 A1 | 3/2014 | Charbit et al. | |
| 2014/0274225 A1 | 9/2014 | Lacatus et al. | |
| 2015/0319681 A1 | 11/2015 | Nathanson et al. | |
| 2017/0069209 A1* | 3/2017 | Beaurepaire | G08G 1/096805 |
| 2017/0251461 A1* | 8/2017 | Parkvall | H04W 72/1289 |

OTHER PUBLICATIONS

3rd Generation Partnership Project (3GPP), "Technical Specification Group Services and System Aspects; Study on LTE support for Vehicle to Everything (V2X) services (Release 14)," 3GPP TR 22.885 V14.0.0, Dec. 2015, 50 pages.

PCT International Application No. PCT/KR2017/002091, International Search Report dated May 31, 2017, 3 pages.

China Unicom, "Requirements for enhancements on User Location Reporting Support," 3GPP TSG-SA WG1 #73, S1-160128, Feb. 2016, 5 pages.

European Patent Office Application Serial No. 17756871.4, Office Action dated May 26, 2020, 4 pages.

* cited by examiner

[Figure 1]
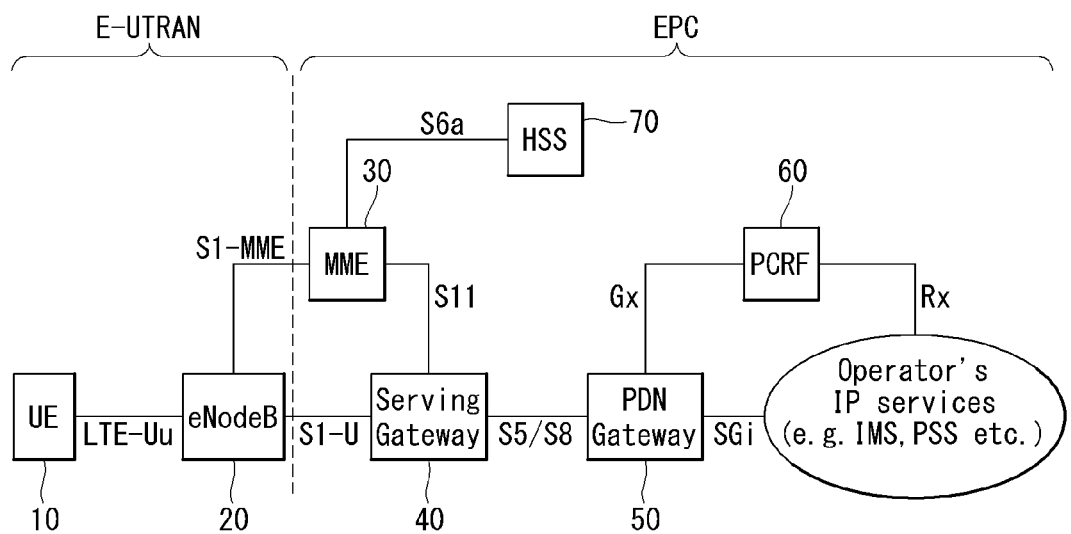

[Figure 2]
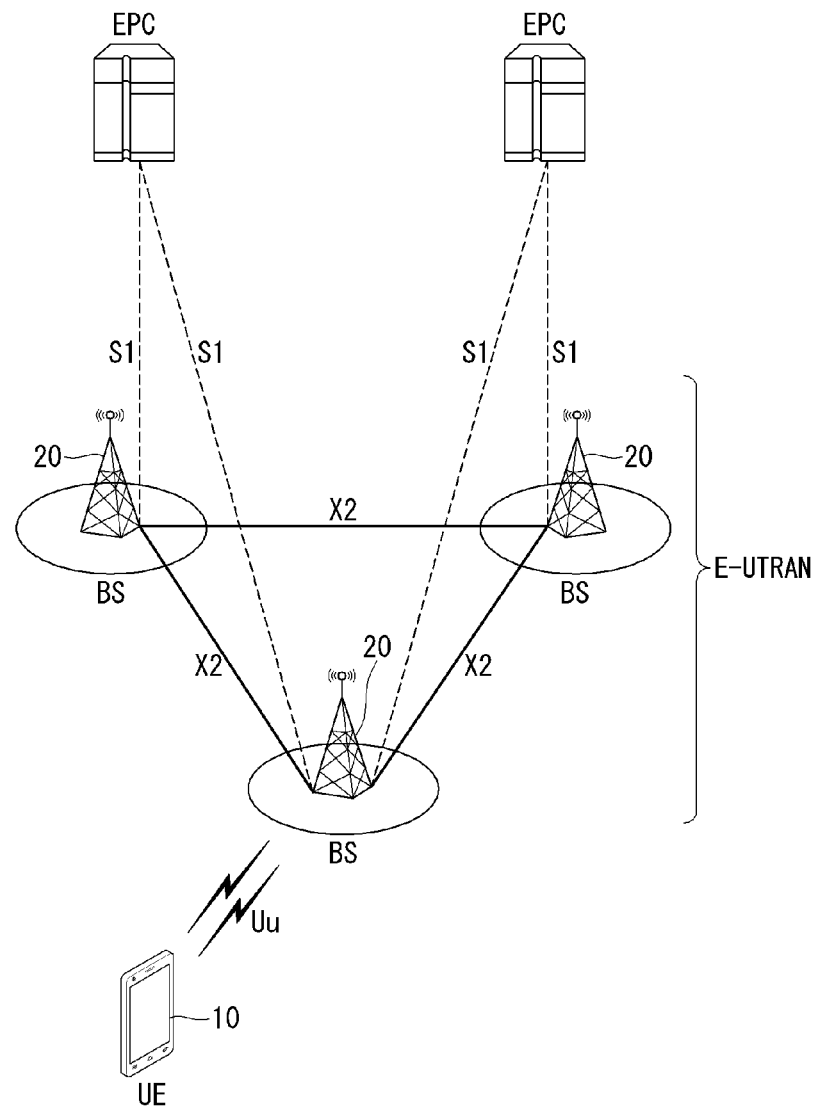

[Figure 3]
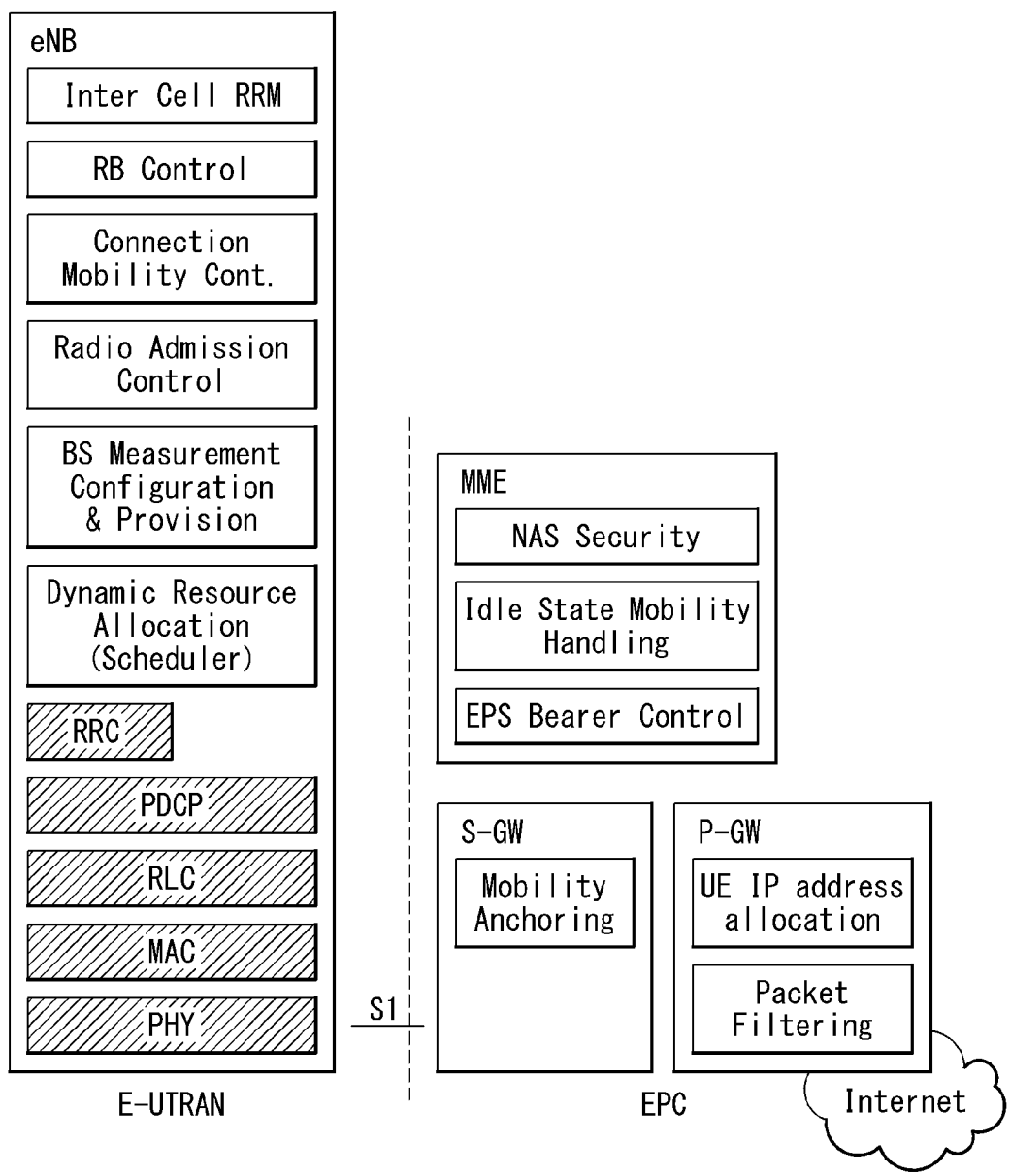

[Figure 4]
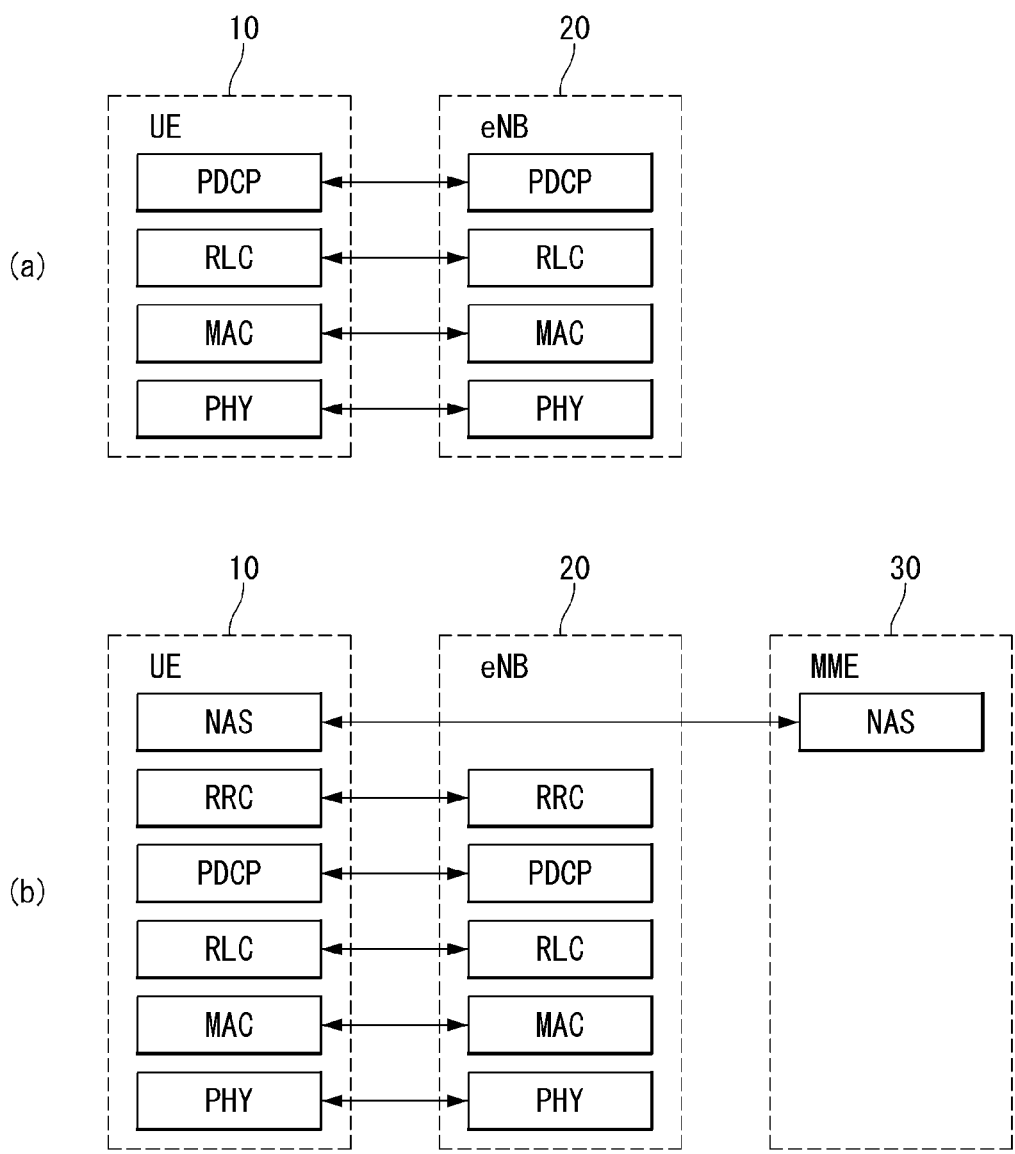

[Figure 5]
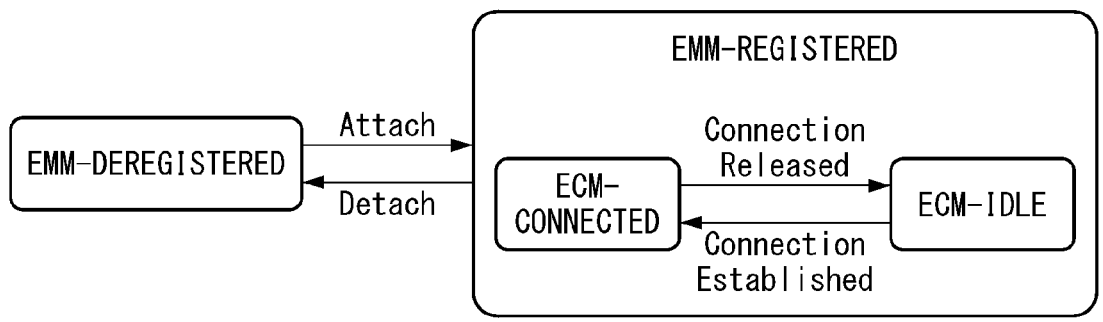
[Figure 6]
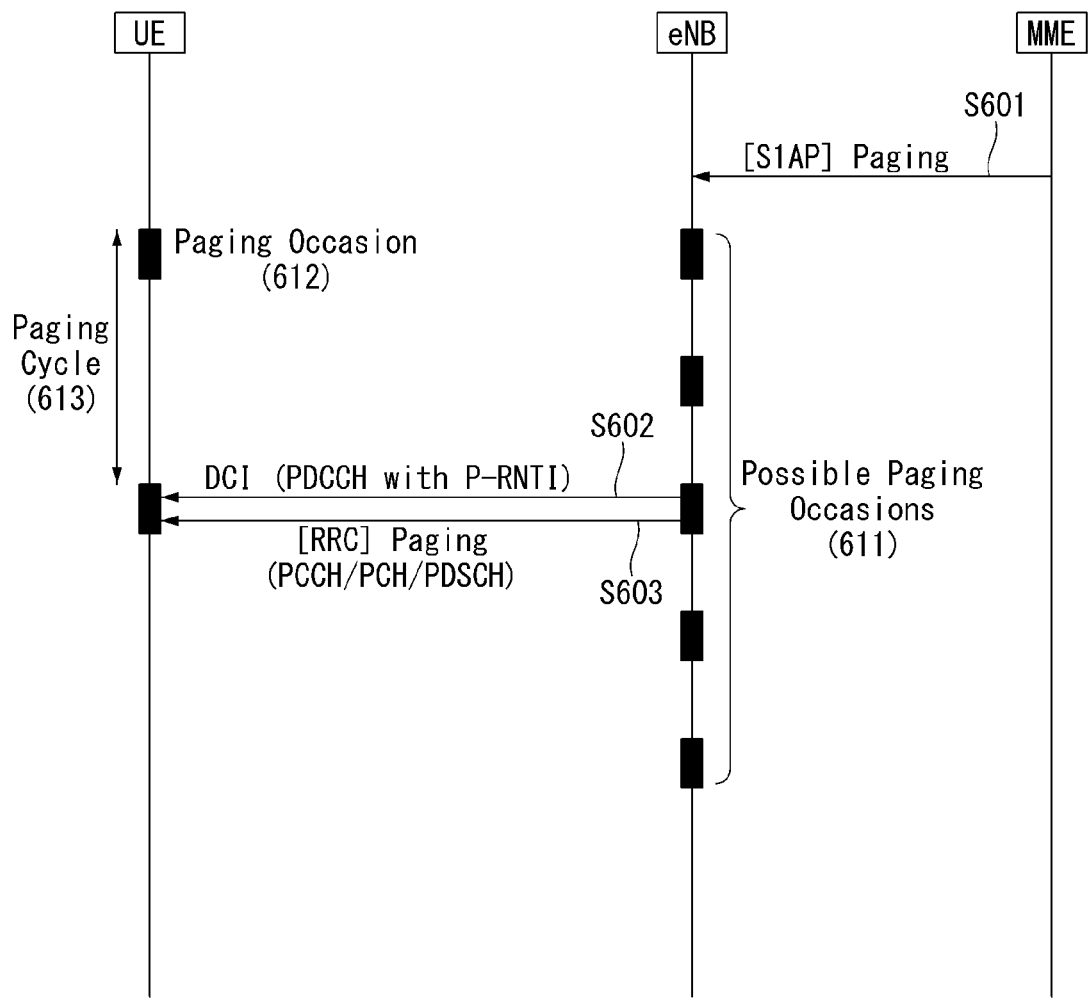

[Figure 7]
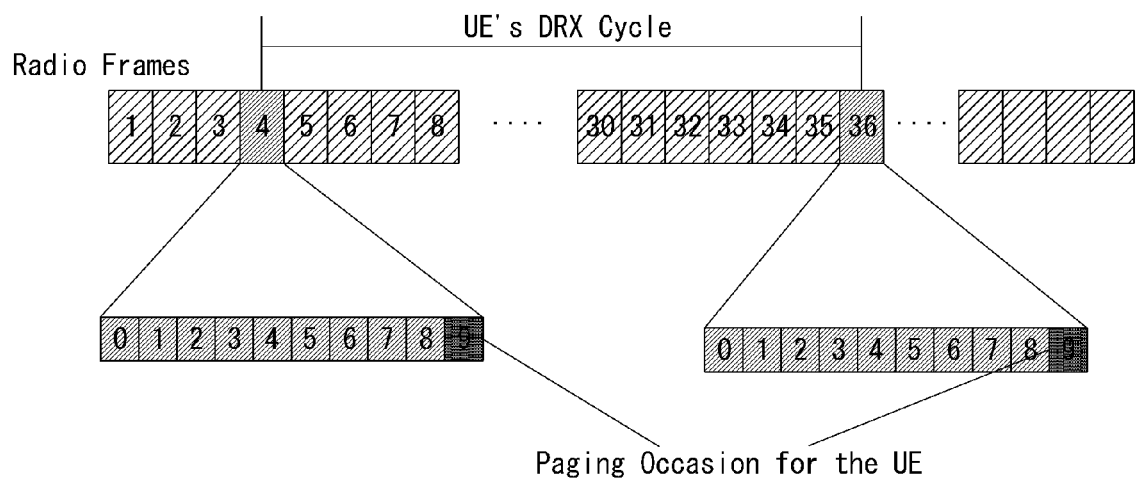
[Figure 8]
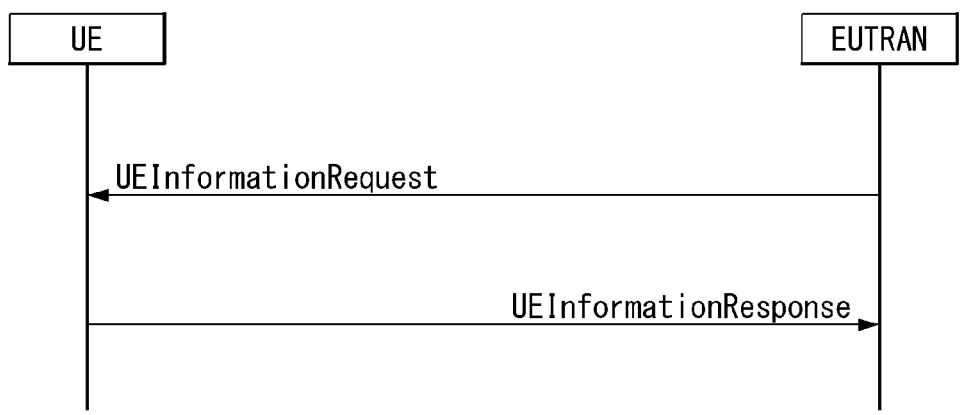

[Figure 9]
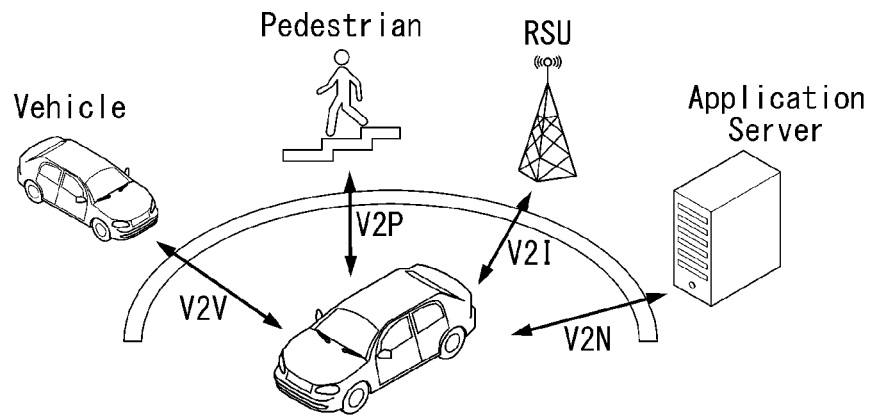
[Figure 10]
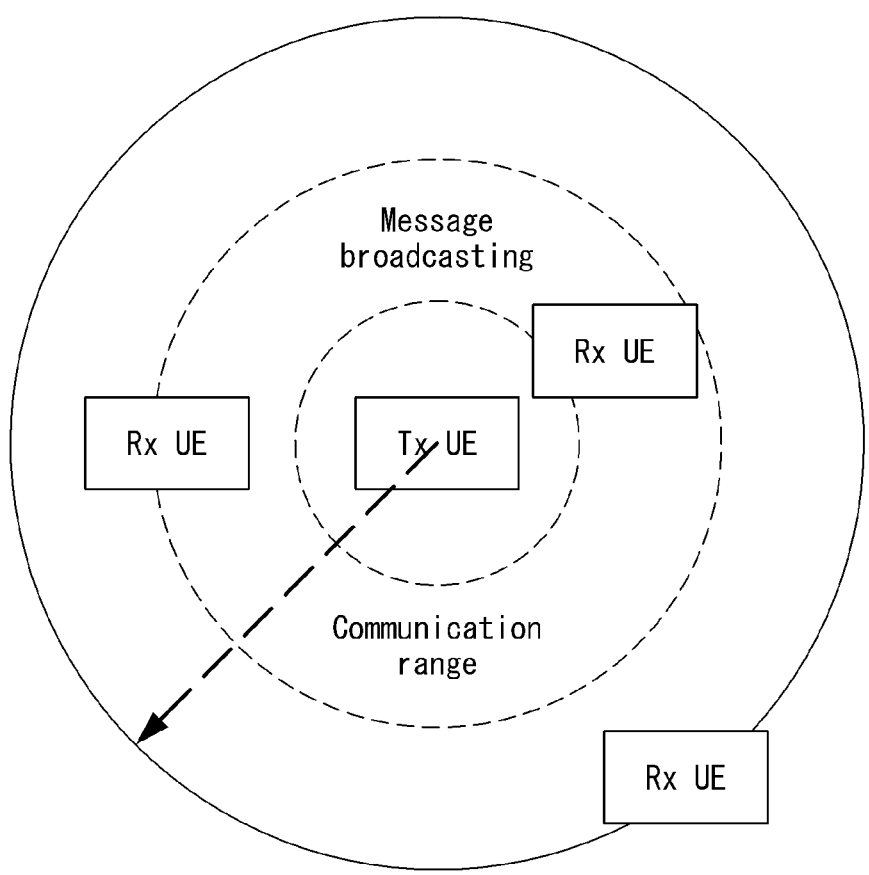

[Figure 11]
(a)
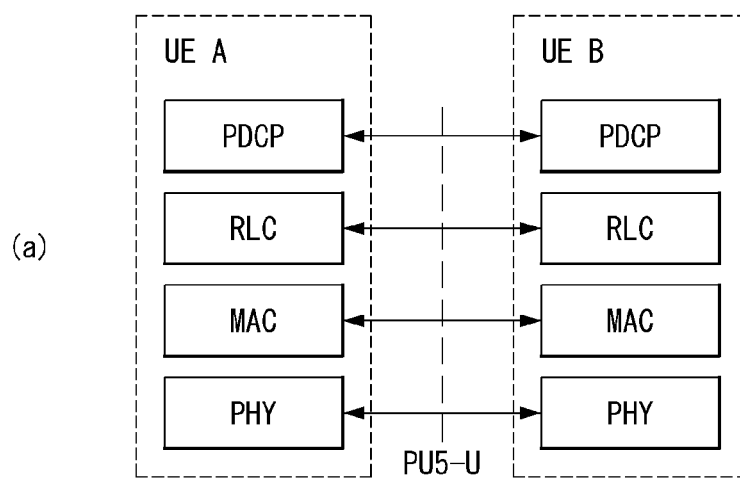
(b)
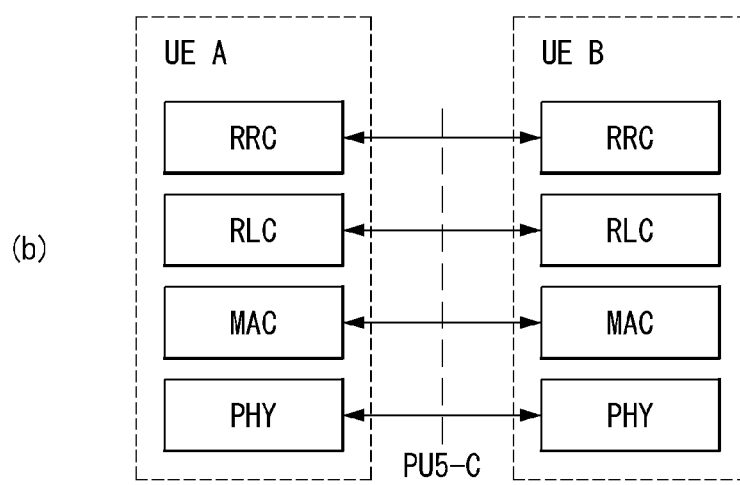

[Figure 12]
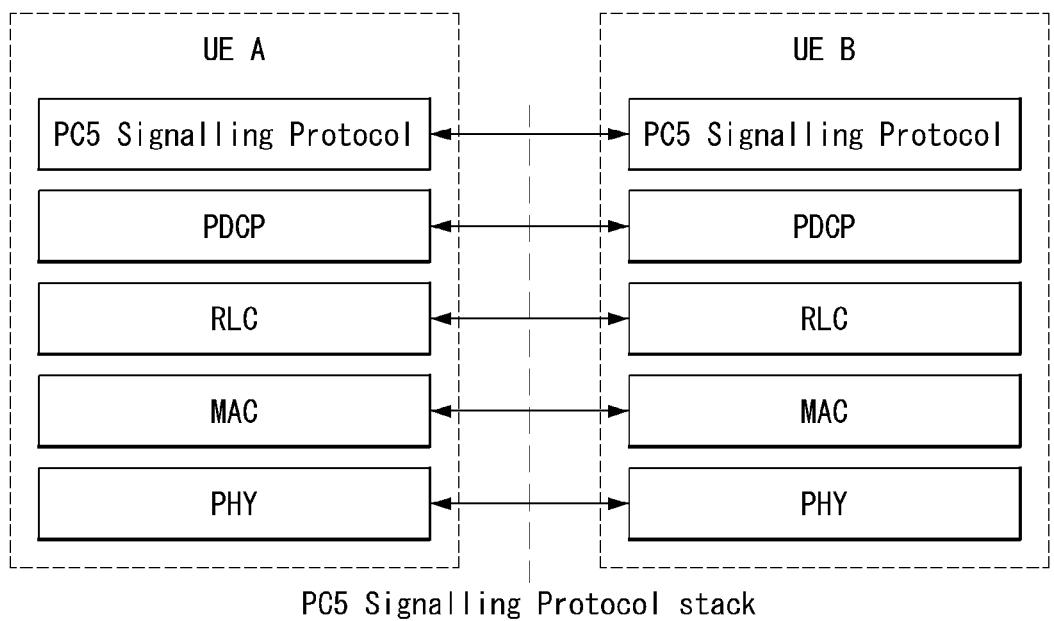

[Figure 13]
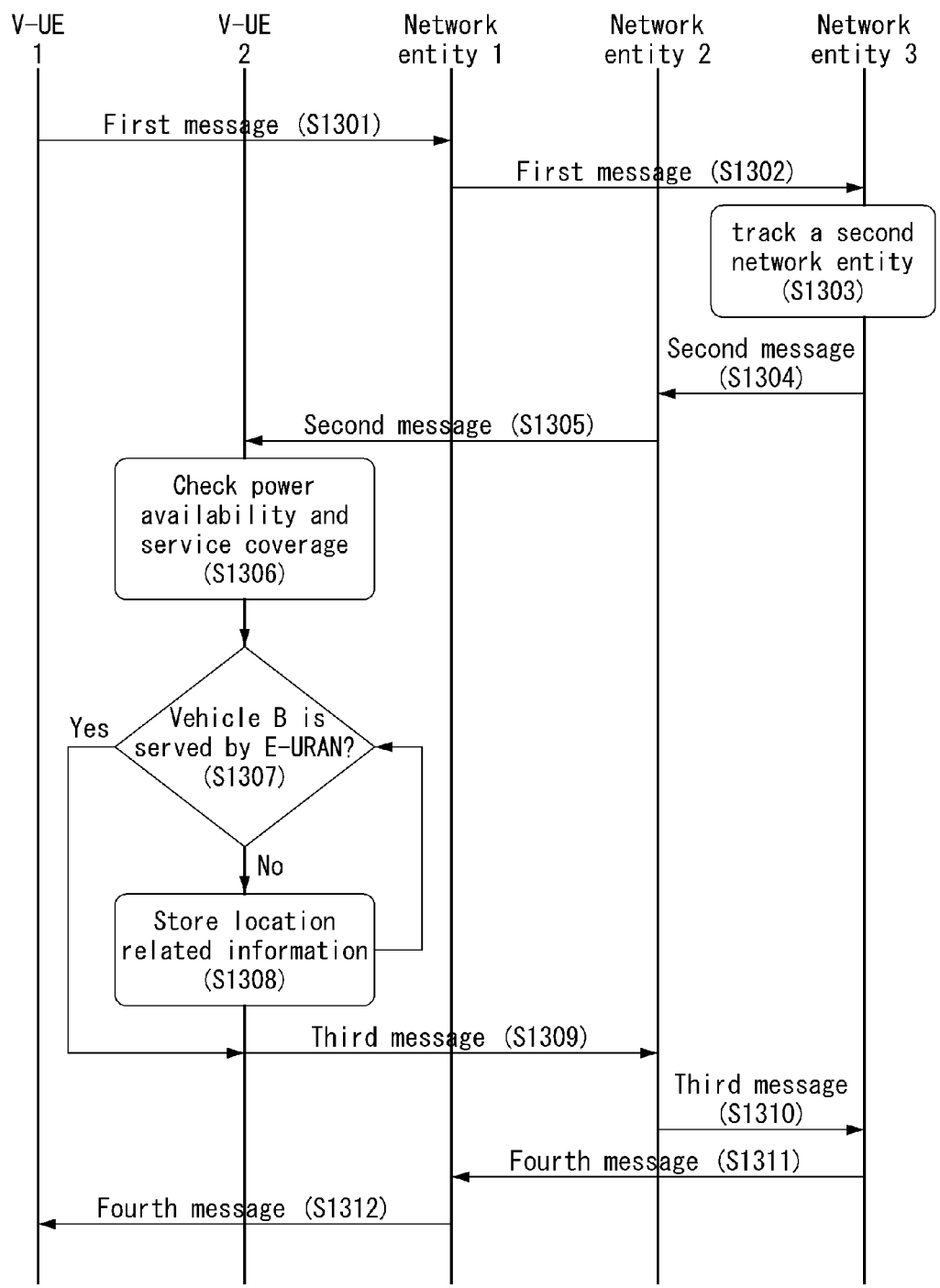

[Figure 14]
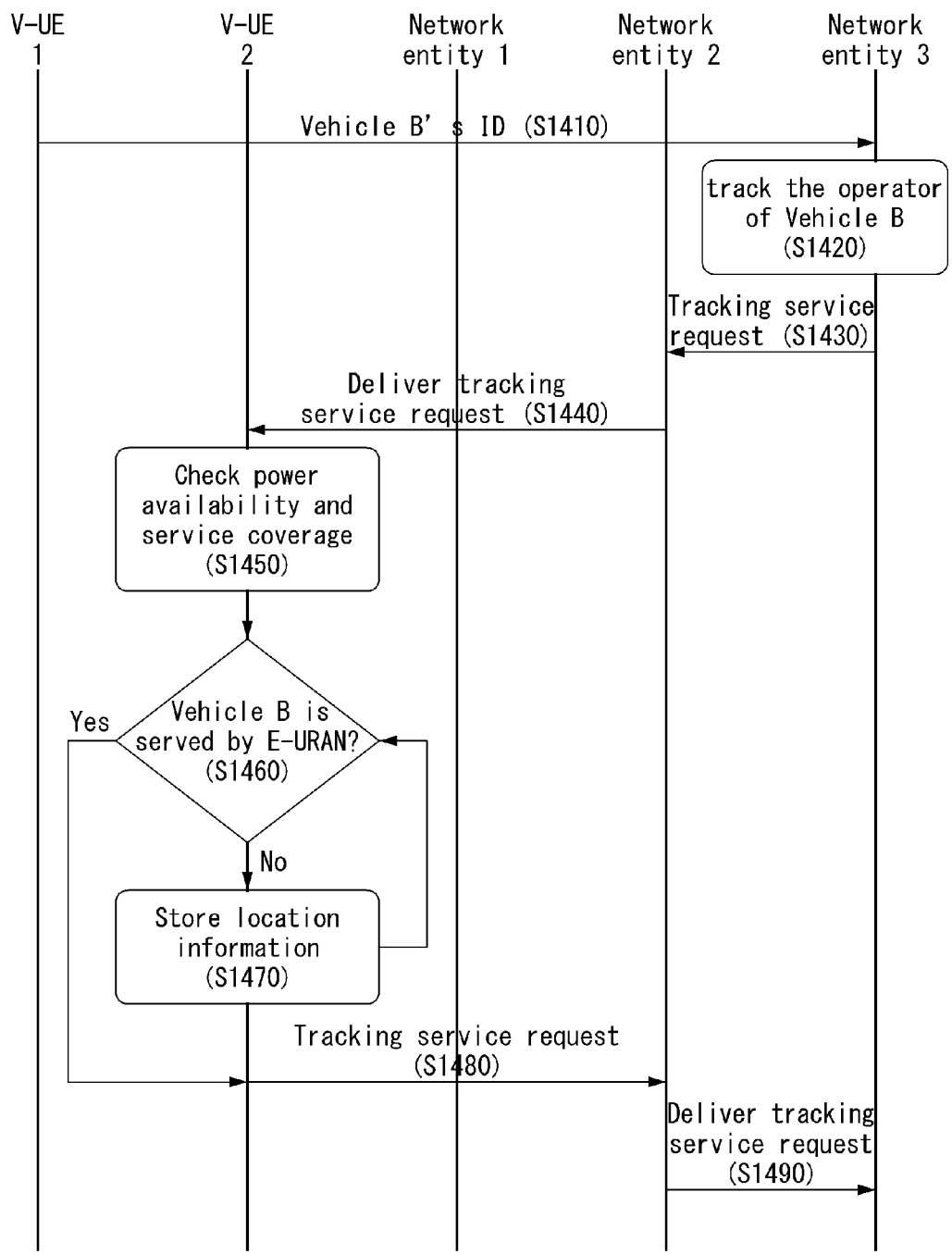

[Figure 15]
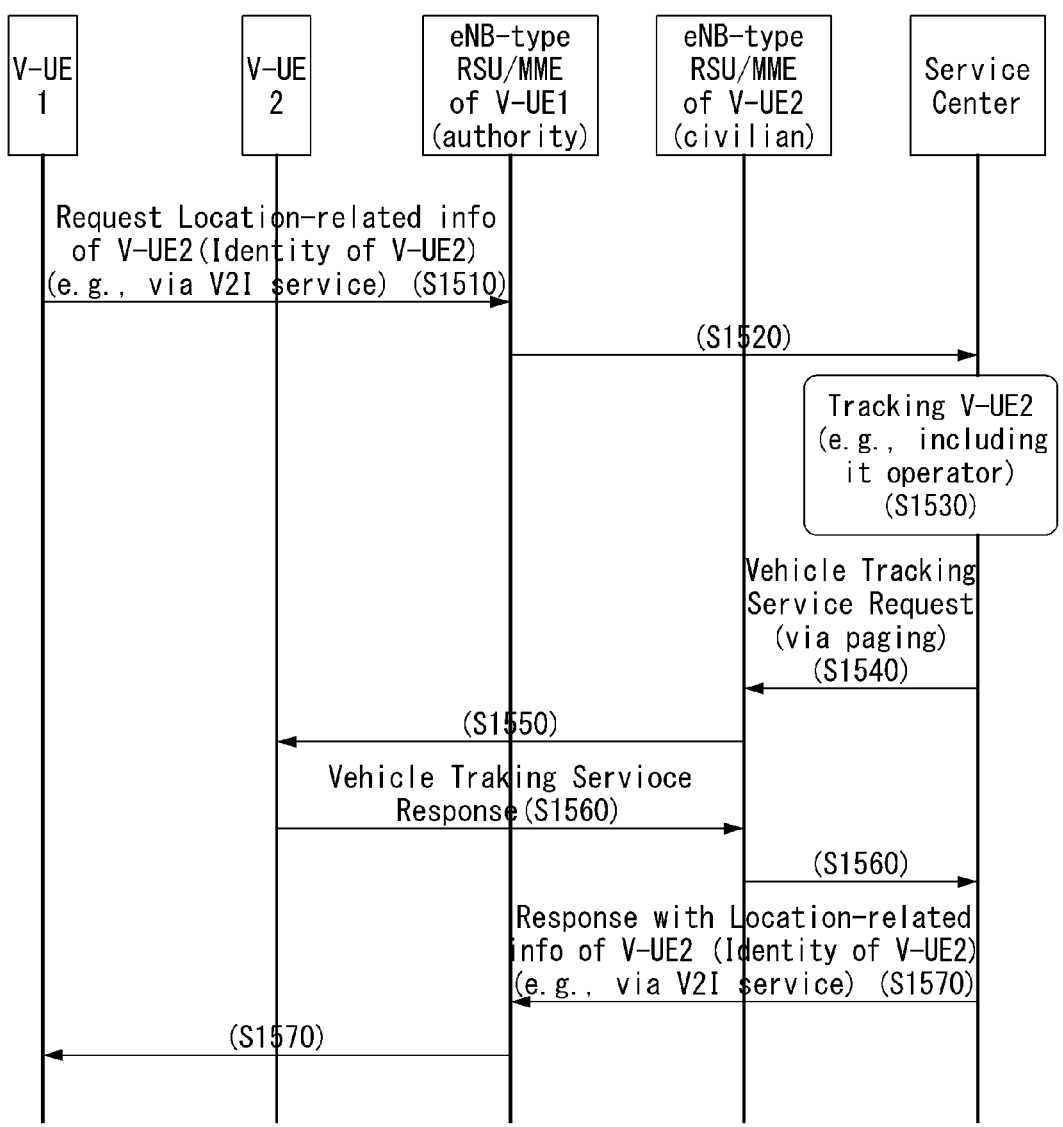

[Figure 16]
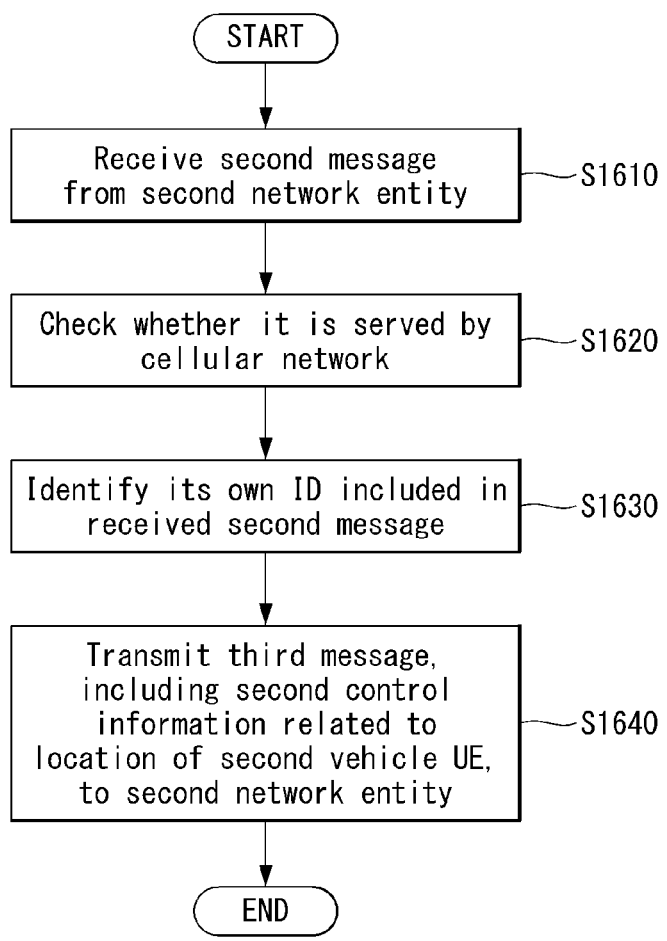

[Figure 17]
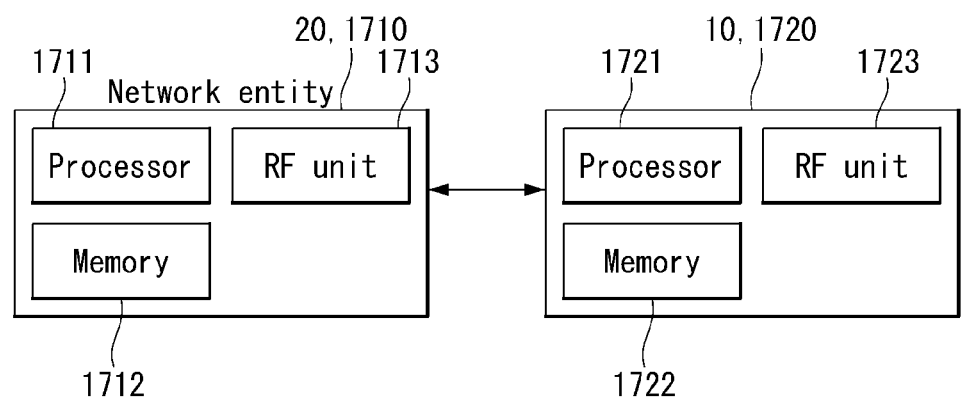

METHOD AND APPARATUS FOR TRACKING LOCATION USING V2X COMMUNICATION IN A WIRELESS COMMUNICATION SYSTEM

TECHNICAL FIELD

This specification relates to a method and apparatus for tracking a location using vehicle-to-X (V2X) communication.

BACKGROUND ART

Mobile communication systems have been developed to provide voice services while assuring users' activities. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support, or device networking.

SUMMARY OF INVENTION

Technical Problem

The present specification is directed to providing a transport layer-based method for providing location tracking services using V2X communication.

Objects to be achieved in this specification are not limited to the aforementioned advantages, and those skilled in the art to which the present invention pertains may evidently understand other objects from the following description.

Technical Solution

In this specification, a method for tracking a location using vehicle-to-X (V2X) communication in a wireless communication system is performed by second vehicle UE, and includes receiving a second message from a second network entity, wherein the second message includes first control information related to the tracking of the location of the second vehicle UE and the first control information includes at least one of identification (ID) information of the second vehicle UE and tracking service indication information indicating whether a tracking service request is present or not, checking whether the second vehicle UE is served by a cellular network, identifying its own ID included in the received second message, and transmitting a third message including second control information related to the location of the second vehicle UE to the second network entity if the second vehicle UE is served by the cellular network.

Furthermore, in this specification, the second control information includes at least one of location information indicative of the location coordinates of the second vehicle UE, time stamp information indicative of the time when the location coordinates are obtained, and V2X accessory information.

Furthermore, in this specification, the method further includes storing the second control information if the second vehicle UE is not served by the cellular network.

Furthermore, in this specification, the method further includes receiving information indicative of the storage of the second control information from the second network entity.

Furthermore, in this specification, the second control information is stored by taking into consideration the power availability of the second vehicle UE.

Furthermore, in this specification, the method further includes transmitting the stored second control information to the second network entity if the second vehicle UE enters the cellular network.

Furthermore, in this specification, the V2X accessory information includes at least one of a fuel level of the vehicle or the number of passengers of the vehicle.

Furthermore, in this specification, the fuel level of the vehicle is combined with at least one of the trajectory of location information of the vehicle, speed of the vehicle, fuel efficiency of the vehicle, and future direction estimation of the vehicle.

Furthermore, in this specification, the second message includes a paging message.

Furthermore, in this specification, if the second message is a paging message of a unicast type, the ID information of the second vehicle UE includes an international mobile subscriber identity (IMSI) mapped to the vehicle identification number (VIN) of the second vehicle UE.

Furthermore, in this specification, the paging message includes paging indication. The resource region of the first control information is preset as a specific resource block (RB) within a fourth subframe after a subframe in which the paging indication is received.

Furthermore, in this specification, wherein the specific RB includes an RB #10.

Furthermore, in this specification, a third message is transmitted by V2X service-capable UE related to the second vehicle UE if the engine of the second vehicle UE is off.

Furthermore, in this specification, the second network entity includes a network entity related to the second vehicle UE, and the second network entity includes an eNB-type road side unit (RSU) and a mobility management entity (MME).

Furthermore, in this specification, vehicle UE for tracking a location using vehicle-to-X (V2X) communication in a wireless communication system includes a radio frequency (RF) unit for transceiving a radio signal and a processor functionally connected to the RF unit. The processor performs control so that a second message is received from a second network entity, the second message including first control information related to the tracking of the location of the second vehicle UE and the first control information including at least one of information about the ID of the second vehicle UE and tracking service indication information indicating whether a tracking service request is present or not, whether the second vehicle UE is served by a cellular network is checked, its own ID included in the received second message is identified, and a third message including second control information related to the location of the second vehicle UE is transmitted to the second network entity if the second vehicle UE is served by the cellular network.

Advantageous Effects

The present specification provides a location tracking service through a transport layer-based method, thereby enabling a location tracking in real time in any situation.

Advantages to be obtained in this specification are not limited to the aforementioned advantages, and those skilled in the art to which the present invention pertains may evidently understand other advantages from the following description.

DESCRIPTION OF DRAWINGS

FIG. 1 is a view illustrating an Evolved Packet System which is associated with the Long Term Evolution (LTE) system to which the present invention may be applied.

FIG. 2 illustrates a wireless communication system to which the present invention is applied.

FIG. 3 illustrates a functional split of an E-UTRAN and an EPC to which the present invention may be applied.

FIG. 4a is a diagram illustrating radio protocol architecture for a user plane.

FIG. 4b is a diagram illustrating radio protocol architecture for a control plane.

FIG. 5 illustrates an EMM and ECM states in a wireless communication system to which the present invention may be applied.

FIG. 6 is a view exemplifying a paging procedure in a wireless communication system to which the present invention may be applied.

FIG. 7 is a view for describing a paging occasion in a wireless communication system to which the present invention may be applied.

FIG. 8 is a flowchart illustrating a procedure of acquiring UE-related information.

FIG. 9 illustrates Types of V2X applications to which the present invention may be applied.

FIG. 10 illustrates Broadcast-based V2V communications to which the present invention may be applied.

FIG. 11a illustrates user-Plane protocol stack for sidelink communication to which the present invention may be applied.

FIG. 11b illustrates control-Plane protocol stack for SBCCH to which the present invention may be applied.

FIG. 12 illustrates control-Plane protocol stack for one-to-one sidelink communication to which the present invention may be applied.

FIG. 13 is a flowchart showing an example of a method for tracking a location using V2X communication, which is proposed according to an embodiment of the present invention.

FIG. 14 is a flowchart showing another example of a method for tracking a location using V2X communication, which is proposed according to an embodiment of the present invention.

FIG. 15 is a flowchart showing another example of a method for tracking a location using V2X communication, which is proposed according to an embodiment of the present invention.

FIG. 16 is a flowchart showing another example of a method for tracking a location using V2X communication, which is proposed according to an embodiment of the present invention.

FIG. 17 is a block diagram illustrating a wireless device in which methods as proposed herein may be implemented.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments may be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term "eNB" may be replaced with a term, such as a "fixed station", a "base station (BS)", a "Node B", a "base transceiver system (BTS)", an "access point (AP)", a "macro eNB or master eNB (MeNB)" or a "secondary eNB (SeNB)." The term "UE" may be replaced with a term, such as a "terminal", a "mobile station (MS)", a "user terminal (UT)", a "mobile subscriber station (MSS)", a "subscriber station (SS)", an "advanced mobile station (AMS)", a "wireless terminal (WT)", a machine-type communication (MTC) device", a "machine-to-machine (M2M) device", a "device-to-device (D2D) device" or a wireless device.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention may be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention may be supported by those documents. Furthermore, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

FIG. 1 is a view illustrating an Evolved Packet System which is associated with the Long Term Evolution (LTE) system to which the present invention may be applied. The LTE system aims to provide seamless Internet Protocol (IP) connectivity between UE 10 and a pack data network (PDN), without any disruption to an end user's application during mobility. While the LTE system encompasses the evolution of the radio access through a Evolved Universal Terrestrial Radio Access Network (E-UTRAN) which defines radio protocol architecture between a user equipment and a BS 20, it is accompanied by the evolution of non-radio aspects under the term "System Architecture Evolution (SAE)" which includes an Evolved Packet Core (EPC) network. The LTE and SAE include an Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as a Core Network (CN), controls the UE and manages establishment of the bearers. As depicted in FIG. 1, the (logical or physical) node of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Furthermore, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Furthermore, it also holds information about the PDNs to which the user may connect. This may be in the form of an Access Point Name (APN), which is a label according to a Domain Name system (DNS) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of Mobility Management (MM) and an MM back-off timer is explained in detail. The mobility management is a procedure to reduce the overhead in the E-UTRAN and processing in the UE. When the mobility management is performed, all UE-related information in the access network may be released during periods of data inactivity. This state may be referred to as EPS Connection Management IDLE (ECM-IDLE). The MME retains the UE context and the information about the established bearers during the idle periods.

To allow the network to contact UE in the ECM-IDLE, the UE updates the network as to its new location whenever it moves out of its current Tracking Area (TA). This procedure is called a "Tracking Area Update", and a similar procedure is also defined in a universal terrestrial radio access network (UTRAN) or GSM EDGE Radio Access Network (GERAN) system and is called a "Routing Area Update." The MME serves to keep track of the user location while the UE is in the ECM-IDLE state.

When there is a need to deliver downlink data to the UE in the ECM-IDLE state, the MME transmits the paging message to all BSs (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a "Service Request Procedure." UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer may be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one BS 20 which provides a control plane and a user plane to UE 10. The UE 10 may be fixed or mobile, and may be referred to as another terminology, such as an MS, a UT, an SS, an MT or a wireless device. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an Evolved Packet Core (EPC), more specifically, to an MME through S1-MME and to an S-GW through S1-U.

The EPC includes an MME, an S-GW, and a P-GW. The MME has access information of the UE or capability information of the UE, and such information is generally used for mobility management of the UE. The S-GW is a gateway having an E-UTRAN as an end point. The P-GW is a gateway having a PDN as an end point.

The layers of a radio interface protocol between the UE and the network may be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 3 illustrates a functional split of an E-UTRAN and an EPC to which the present invention may be applied.

Referring to the FIG. 3, the eNB may perform functions of selection for a gateway (e.g., an MME), routing toward the gateway during Radio Resource Control (RRC) activation, scheduling and transmitting of paging messages, scheduling and transmitting of broadcast channel (BCH) information, dynamic allocation of resources to the UEs in both uplink and downlink, configuration and provisioning of eNB measurements, radio bearer control, Radio Admission Control (RAC), and connection mobility control in LTE_ACTIVE state. In the EPC, and as mentioned above, the gateway may perform functions of paging origination, LTE_IDLE state management, ciphering of the user plane, System Architecture Evolution (SAE) bearer control, and ciphering and integrity protection of NAS signaling.

FIG. 4a is a diagram illustrating radio protocol architecture for a user plane. FIG. 4b is a diagram illustrating radio protocol architecture for a control plane. The user plane is a protocol stack for user data transmission. The control plane is a protocol stack for control signal transmission.

Referring to FIGS. 4a and 4b, a PHY layer provides an upper layer with an information transfer service through a physical channel. The PHY layer is connected to a Medium Access Control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data is transferred through the physical channel. The physical channel is modulated using an Orthogonal Frequency Division Multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC Service Data Unit (SDU) belonging to the logical channel. The MAC layer provides a service to a radio link control (RLC) layer through the logical channel.

A function of the RLC layer includes RLC SDU concatenation, segmentation, and reassembly. To ensure a variety of Quality of Service (QoS) required by a Radio Bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB may be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages may be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Furthermore, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, the RRC state and RRC connection of UE will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. In the RRC connected state, the UE has an RRC connection and thus the E-UTRAN may recognize a presence of the UE in a cell unit. Accordingly, the UE may be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

EMM and ECM State

In what follows, EPS Mobility Management (EMM) and EPS Connection Management (ECM) states is described.

FIG. 5 illustrates an EMM and ECM states in a wireless communication system to which the present invention may be applied.

With reference to FIG. 5, to manage mobility of the UE in the NAS layer defined in the control planes of the UE and the MME, EMM-REGISTERED and EMM-DEREGISTERED states may be defined according to the UE is attached to or detached from a network. The EMM-REGISTERED and the EMM-DEREGISTERED states may be applied to the UE and the MME.

Initially, the UE stays in the EMM-DEREGISTERED state as when the UE is first powered on and performs registering to a network through an initial attach procedure to connect to the network. If the connection procedure is performed successfully, the UE and the MME makes transition to the EMM-REGISTERED state. Furthermore, in case the UE is powered off or the UE fails to establish a radio link (namely, a packet error rate for a radio link exceeds a reference value), the UE is detached from the network and makes a transition to the EMM-DEREGISTERED state.

Similarly, to manage signaling connection between the UE and the network, ECM-CONNECTED and ECM-IDLE states may be defined. The ECM-CONNECTED and ECM-IDLE states may also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, in case the RRC layer of the UE is connected to the RRC layer of the eNB, the UE stays in the RRC_CONNECTED state. If the RRC layer of the UE is not connected to the RRC layer of the eNB, the UE stays in the RRC_IDLE state.

The network may identify the UE staying in the ECM-CONNECTED state at the level of cell unit and may control the UE in an effective manner.

On the other hand, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE may receive a broadcast signal of system information and paging information by monitoring a paging signal at a specific paging occasion for each UE-specific paging DRX cycle.

When the UE is in the ECM-IDLE state, the network does not carry context information of the UE. Therefore, the UE staying in the ECM-IDLE state may perform a mobility-related procedure based on the UE such as cell selection or cell reselection without necessarily following an order of the network. In case the position of the UE differs from the position recognized by the network while the UE is in the ECM-IDLE state, the UE may inform the network of the corresponding position of the UE through a Tracking Area Update (TAU) procedure.

On the other hand, when the UE is in the ECM-CONNECTED state, mobility of the UE is managed by an order of the network. While the UE stays in the ECM-CONNECTED state, the network knows to which cell the UE currently belongs. Therefore, the network may transit and/or receiver data to or from the UE, control mobility of the UE such as handover, and perform cell measurement with respect to neighboring cells.

As described above, the UE has to make a transition to the ECM-CONNECTED state in order to receive a general mobile communication service such as a voice or data communication service. When the UE is first powered on, the UE in its initial state stays in the ECM-IDLE state as in the EMM state, and if the UE successfully registers to the corresponding network through an initial attach procedure, the UE and the MEE make a transition to the ECM connection state. Furthermore, in case the UE has already registered to the network but radio resources are not allocated as traffic is not activated, the UE stays in the ECM-IDLE state, and if new uplink or downlink traffic is generated for the corresponding UE, the UE and the MME shift to the ECM-CONNECTED state through a service request procedure.

Paging

The paging procedure is used in order to transmit paging information to UE in RRC_IDLE mode in network, or to notify change of system information to UE in RRC_IDLE/RRC_CONNECTED mode, or to notify ETWS primary notification and/or ETWS secondary notification to all UEs in RRC_IDLE/RRC_CONNECTED mode, or to notify CMAS notification to UE in RRC_IDLE/RRC_CONNECTED mode.

FIG. 6 is a view exemplifying a paging procedure in a wireless communication system to which the present invention may be applied.

Referring to FIG. 6, an MME starts a paging procedure by transmitting a paging message to an eNB (S601).

As described above, locations of UE in ECM-IDLE state is managed in the MME based on Tracking Area (TA). At the moment, since the UE may be registered by one or more TAs, the MME may transmit a paging message to a plurality of eNBs that cover the cell belonged to the TA(s) where the UE is registered. In this case, each cell may be belonged to only one TA, and each eNB may include cells belonged to different TAs.

Herein, the MME transmits a paging message to each eNB through S1AP interface. Hereinafter, this may be referred to an "S1AP paging message."

Table 1 exemplifies the S1AP paging message.

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 . . . <maxnoofTAIs> | | | EACH | ignore |
| >>TAI | M | | 9.2.3.16 | | — | |
| CSG Id List | | 0 . . . 1 | | | GLOBAL | ignore |
| >CSG Id | | 1 . . . <maxnoofCSGId> | 9.2.1.62 | | — | |
| Paging Priority | O | | 9.2.1.78 | | YES | ignore |

Referring to Table 1, IE/Group Name represents a name of an information element (IE) or an IE group. "M" in the Presence field is a mandatory IE, and represents an IE/IE group included in a message always. "O" is an optional IE and represents an IE/IE group included or may not be included in a message. "C" is a conditional IE and represents an IE/IE group included in a message only when a specific condition is satisfied. The Range field represents a number of which repeated IEs/IE groups is available to be repeated.

The IE type and reference field represents a type of the corresponding IE (e.g., ENUMERATED, INTEGER, OCTET STRING, etc.), and if a range of a value that the corresponding IE may have is existed, represents the range of the value.

The Criticality field represents criticality information that is applied to an IE/IE group. The criticality information means information indicating how a reception terminal operates if the reception terminal does not understand all or a part of the IE/IE group. The sign, "-", represents that the criticality information is not applied, and the sign "YES" represents the criticality information is applied. "GLOBAL" represents that an IE and repeated IE have one piece of common criticality information. "EACH" represents that each of repeated IE has unique criticality information. Assigned Criticality field represents actual criticality information.

The information element (IE) or IE group included in the S1AP paging message is described in more detail below.

Message type IE distinguishes a message which is transmitted.

UE Identity Index value IE is used for an eNB to calculate Paging Frame (PF) (e.g., UE Identity Index=UE IMSI mod 1024).

UE paging identity IE is an identity for distinguishing UE which is paged, and is indicated by one of IMSI and SAE temporary mobile subscriber identity (S-TMSI). The S-TMSI means an identity used to uniquely identify UE within one MME group.

If UE uses a UE-specific DRX cycle length, Paging DRX IE is used to calculate paging frame (PF) for an eNB. The UE may specify the DRX cycle length in the attach request message or tracking area update (TAU) message.

CN Domain IE indicates whether the paging is generated in circuit switched (CS) domain or packet switched (PS) domain.

Tracking Area Identity (TAI) List IE is used to notify a TA in which a paging message should be broadcasted to an eNB. The TAI means an identity which is used to uniquely distinguish TA.

Closed Subscriber Group (CSG) ID List IE represents a CSG set where UE is prescribed. This prevents an eNB from paging to UE in a CSG cell where the UE is not prescribed.

The eNB that receives S1AP paging message from the MME configures a paging message (hereinafter referred to an "RRC paging message").

Table 2 exemplifies a RRC paging message.

TABLE 2

```
-- ASN1START
Paging ::=                         SEQUENCE {
    pagingRecordList               PagingRecordList          OPTIONAL, --
Need ON
    systemInfoModification         ENUMERATED {true}         OPTIONAL, --
Need ON
    etws-Indication                ENUMERATED {true}         OPTIONAL, --
```

TABLE 2-continued

```
Need ON
    nonCriticalExtension         Paging-v890-IEs              OPTIONAL --
Need OP
}
Paging-v890-IEs ::=      SEQUENCE {
    lateNonCriticalExtension     OCTET STRING                 OPTIONAL, --
Need OP
    nonCriticalExtension         Paging-v920-IEs               OPTIONAL -
- Need OP
}
Paging-v920-IEs ::=      SEQUENCE {
    cmas-Indication-r9           ENUMERATED {true}            OPTIONAL, --
Need ON
    nonCriticalExtension         Paging-v1130-IEs             OPTIONAL --
Need OP
}
Paging-v1130-IEs ::=     SEQUENCE {
    eab-ParamModification-r11    ENUMERATED {true}            OPTIONAL, --
Need ON
    nonCriticalExtension         SEQUENCE { }                 OPTIONAL --
Need OP
}
PagingRecordList ::=             SEQUENCE (SIZE (1..maxPageRec))  OF
PagingRecord
PagingRecord ::=                 SEQUENCE {
    ue-Identity                      PagingUE-Identity,
    cn-Domain                        ENUMERATED  {ps, cs},
    ...
}
PagingUE-Identity ::=            CHOICE {
    s-TMSI                           S-TMSI,
    imsi                             IMSI,
    ...
}
IMSI ::=                         SEQUENCE (SIZE (6..21)) OF IMSI-Digit
IMSI-Digit ::=                   INTEGER (0..9)
-- ASN1STOP
```

Referring to Table 2, a single RRC paging message of UE may carry information of multiple S1AP paging messages. That is, the RRC paging message may include multiple paging records (e.g., 16) for paging multiple UEs.

Each paging record includes a UE-Identity field and a CN domain field. This is a content which is transmitted from a S1AP paging message.

The systemInfoModification field is not delivered from the S1AP paging message, but is generated by an eNB. This field is used for triggering such that UE re-acquires a system information block (SIB) set.

The Extended Access Barring (EAB)-ParamModification field is used to indicate change of EAB parameter (SIB 14).

The ETWS-Indication field is not delivered from the S1AP paging message, but is generated by an eNB. This field is applied only to an ETWS capable UE, and is used to trigger such that the corresponding UE re-acquires SIB 1. The SIB 1 content indicates ETWS content in SIB 10 and SIB 11 to UE.

The CMAS-Indication field is applied only to a CMAS capable UE, and is used to trigger such that the corresponding UE re-acquires SIB 1. The SIB 1 content indicates CMAS content in SIB 12 to UE.

As such, the eNB that configures the RRC paging message transmits downlink control information (DCI) to which cyclic redundancy check (CRC) scrambled with paging-RNTI (P-RNTI) is attached to UE on the PDCCH (S602), and transmits the RRC paging message to the UE on the PDSCH (S603).

That is, an eNB delivers the RRC paging message through the PCCH logical channel, the PCH transport channel and the PDSCH physical channel to UE.

In more detail, the eNB determines a PDCCH format according to the DCI that will be sent to the UE, and attaches CRC to the DCI. According to the owner or use of the PDCCH, a unique radio network temporary identifier (RNTI) is scrambled (or masked) to CRC. For the PDCCH for a specific UE, a unique identity of UE (e.g., cell-RNTI; C-RNTI) may be masked to CRC. Or, for the PDCCH for a paging message, a paging indication identity (e.g., paging-RNTI; P-RNTI) may be masked to CRC.

That is, UE monitors the PDCCH based on P-RNTI in a subframe belonged to its paging occasion 612. And in order to detect the PDCCH masked by P-RNTI, the UE decodes the DCI transmitted on the PDCCH. The DCI indicates the PDSCH resource where the paging message is transmitted. And the UE decodes the RRC paging message from the PDSCH resource indicated in the DCI.

The paging cycle 613 may be determined in a cell-specific manner, or determined in a UE-specific manner. In addition, the paging occasion 612 is determined based on its paging cycle 613 and its identity (i.e., IMSI) for each UE. Accordingly, the paging message is not transmitted to all UEs on an available paging occasion 611 from an eNB, but the paging message is transmitted on the paging occasion of the corresponding UE. The paging occasion is described in more detail later.

The paging procedure may be used for notifying change of system information, reception of cell broadcast message (i.e., ETWS/CAMS warning message) and change of EAB as well as notifying reception of individual UE's Mobile Terminated (MT) call.

If a UE identity (e.g., IMSI or S-TMSI) is included (i.e., if the paging procedure is used for MT call) in one of paging records included in the RRC paging message, the UE in RRC_IDLE mode starts a random access procedure for establishing RRC connection (e.g., transmitting service request) with network.

Furthermore, if system information modification (systemInfoModification) is included in the RRC paging message, UE re-acquires the system information which is required by using a system information acquisition procedure.

In addition, if the ETWS indication (etws-Indication) is included in the RRC paging message and UE supports the ETWS, the UE re-acquires SIB 1 immediately. That is, the UE does not wait for the boundary of the next system information modification cycle. And if the scheduling information list (schedulingInfoList) included in SIB 1 indicates that SIB 10 is existed, the UE acquires SIB 10 based on the scheduling information (schedulingInfor). In addition, if the scheduling information list (schedulingInfoList) included in SIB 1 indicates that SIB 11 is existed, the UE acquires SIB 11 based on the scheduling information (schedulingInfor).

Furthermore, CMAS indication (cmas-Indication) is included in the RRC paging message and UE supports CMAS, the UE re-acquires SIB 1 immediately. That is, the UE does not wait for the boundary of the next system information modification cycle. And if the scheduling information list (schedulingInfoList) included in SIB 1 indicates that SIB 12 is existed, the UE acquires SIB 12 based on the scheduling information (schedulingInfor).

As such, if a cell broadcast message (i.e., ETWS/CAMS message) indication is included in the RRC paging message, UE receives SIB 10, SIB 11 and SIB 12 by referring to schedulingInfoList of SIB 1. The received SIB 10, SIB 11 and SIB 12 are delivered to a higher layer (e.g., RRC layer) of UE. In the higher layer of UE, the UE displays the message identifier included in the cell broadcast message which is delivered through SIB 10, SIB 11 and SIB 12 if the message identifier is included in a search list of the UE. And otherwise, the UE discards it.

In addition, if UE in RRC_IDLE mode supports the EAB and the EAB parameter modification (eab-ParamModification) field is included in the RRC paging message, the UE regards SIB 14 which is stored before is not valid, and re-acquires SIB 1 immediately. That is, the UE does not wait for the boundary of the next system information modification cycle. And the UE re-acquires SIB 14 using the system information acquisition procedure.

Hereinafter, a paging occasion is described.

FIG. 7 is a view for describing a paging occasion in a wireless communication system to which the present invention may be applied.

3GPP LTE/LTE-A system defines discontinuous reception (DRX) technique of UE in order to minimize the power consumption of UE.

A UE that uses the DRX monitors whether a paging message is transmitted only one paging occasion for every Paging cycle (i.e., DRX cycle).

One Paging Frame (PF) means one radio frame that may include one or more paging occasion(s).

One paging occasion (PO) means one subframe where the P-RNTI transmitted on the PDCCH that addresses a paging message may be existed. That is, the paging occasion is defined as a specific subframe in a PF that UE checks a paging message.

The PF and the PO are determined by using IMSI and DRX values of UE. The UE may calculate the PF and the PO using its IMSI and DRX values. In addition, an eNB may also calculate the PF and the PO for each UE through the IMSI value which is delivered from the MME.

The DRX parameter (i.e., paging/PCCH configuration information) may be transmitted with being included in a common radio resource configuration ("RadioResourceConfigCommon") IE which is a RRC message used for specifying common radio resource configurations. The common radio resource configuration IE may be transmitted through a RRC message such as a RRC connection reconfiguration message or an SI message. The SI message is a message which is used for transmitting one or more SIBs.

In addition, UE may also request its DRX cycle through an attach request or a tracking area update (TAU) request message. At the moment, a DRX cycle length set that the UE may request is identical to the length set which is used in the system information.

Table 3 exemplifies the PCCH configuration information in the common radio resource configuration IE.

TABLE 3

| | |
|---|---|
| PCCH-Config ::= | SEQUENCE { |
| defaultPagingCycle | ENUMERATED { |
| | rf32, rf64, rf128, rf256}, |
| nB | ENUMERATED { |
| | fourT, twoT, oneT, halfT, quarterT, |
| oneEighthT, | |
| | oneSixteenthT, oneThirtySecondT} |
| } | |

Referring to Table 3, the PCCH configuration information includes the "defaultPagingCycle" field that indicates a basic paging cycle length and the parameter "nB" for acquiring the paging frame and the paging occasion.

The "defaultPagingCycle" field has a basic paging cycle length, and setup as one value of {rf32, rf64, rf128, rf256}. The rf means radio frame, and the numbers behind the "rf" means the number of radio frames. For example, if "defaultPagingCycle"=rf32, the paging basic cycle includes 32 radio frames, and if "defaultPagingCycle"=rf64, the paging basic cycle includes 64 radio frames.

The value of "nB" parameter is indicated by a multiple of "T" (4T, 2T, T, T/2, T/4, T/8, T/16 or T/32). For example, if "nB"=fourT, the parameter value of "nB" is 4*T, and if "nB"=quarterT, the parameter value of "nB" is T/4.

In this case, "T" represents a DRX cycle of UE. "T" is determined to the smallest value among a UE-specific DRX cycle and the basic DRX cycle ("defaultPagingCycle" field value) which is broadcasted in the system information. If the UE-specific DRX cycle is not setup by a higher layer, "T" is determined to the basic DRX cycle.

The PF is determined according to Equation 1 below.

$$\text{SFN mod } T = (T \text{ div } N)*(UE\_ID \text{ mod } N) \quad \text{[Equation 1]}$$

In Equation 1, N represents min (T, nB), and UE_ID represents (IMSI mod 1024).

A UE does not monitor all subframes of the PF which is determined as above, but monitors only the subframe which is distinguished by the PO determined by Equation 2 below and Table 4 (or Table 5).

$$i\_s = \text{floor}(UE\_ID/N) \text{ mod } Ns \quad \text{[Equation 2]}$$

In Equation 2, Ns represents max(1, nB/T).

Table 4 exemplifies a subframe pattern for determining the PO in FDD.

TABLE 4

| Ns | PO when i_s = 0 | PO when i_s = 1 | PO when i_s = 2 | PO when i_s = 3 |
|---|---|---|---|---|
| 1 | 9 | N/A | N/A | N/A |
| 2 | 4 | 9 | N/A | N/A |
| 4 | 0 | 4 | 5 | 9 |

Table 5 exemplifies a subframe pattern for determining the PO in TDD.

TABLE 5

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

By applying i_s value which is determined by Equation 2 above to Table 4 and Table 5, the subframe index that corresponds to the PO is determined. That is, UE monitors only the subframe that corresponds to the PO in the PF which is determined. In the example of FIG. 7, in the case that the DRX cycle of the UE is 320 ms (i.e., 32 radio frames=rf32), radio frame 4 and radio frame 36, and so on may be determined to be the PF based on Equation 1 above. And, the UE monitors the paging message only in subframe 9 of radio frame 4 and subframe 9 of radio frame 36 which is the PO determined based on Equation 2 and Table 4 (or Table 5) above.

UE Information

The UE information procedure is used by E-UTRAN to request the UE to report information.

E-UTRAN initiates the procedure by sending the UEInformationRequest message. E-UTRAN should initiate this procedure only after successful security activation.

FIG. 8 is a flowchart illustrating a procedure of acquiring UE-related information. In 3GPP, the eNB may request a certain type of information, which is also referred to as UE information, by using an RRC message such as "UEInformationRequest." As shown in FIG. 8, the eNB of E-UTRAN may transmit "UEInformationRequest" to the UE to obtain the UE-related information. In response to the "UEInformationRequest", the UE transmits "UEInformationResponse" based on specific indications included in the "UEInformationRequest."

General V2X (Vehicle-to-X)

First, terms used in V2X are defined as follows.

A Road Side Unit (RSU): a Road Side Unit (RSU) is a V2X Service enabled device that may transmit to, and receive from a moving vehicle using V2I Service.

Furthermore, the RSU is a stationary infrastructure entity supporting V2X applications that may exchange messages with other entities supporting V2X applications.

Pseudonymity: The condition when the processing of personally identifiable information (PII) is such the data may no longer be attributed to a specific subscriber without the use of additional information, as long as such additional information is kept separately and subject to technical and organizational measures to ensure non-attribution to an identified or identifiable subscriber.

The RSU is a term frequently used in existing ITS specifications, and the reason for introducing the term in the 3GPP specifications is to make the documents easier to read for the ITS industry.

The RSU is a logical entity that combines V2X application logic with the functionality of an eNB (referred to as eNB-type RSU) or UE (referred to as UE-type RSU).

V2I Service: the type of V2X Service, where one party is a vehicle whereas the other party is entity belonging to infrastructure.

V2P Service: the type of V2X Service, where one party is a vehicle whereas the other party is a device carried by an individual (e.g., handheld terminal carried by a pedestrian, cyclist, driver or passenger).

V2X Service: the type of 3GPP communication service that involves a transmission or receiving device on a vehicle.

Based on the other party involved in the communication, it may be further divided into V2V Service, V2I Service, and V2P Service.

V2X-enabled UE: UE supporting V2X Service.

V2V Service: the type of V2X Service, where both parties of the communication are vehicles.

V2V Communication Range: a direct communication range between two vehicles engaged in V2V Service.

Types of V2X Application Support

The V2X applications in the present specification, referred to as Vehicle-to-Everything (V2X), contain the following four different types:

Vehicle-to-Vehicle (V2V)
Vehicle-to-Infrastructure (V2I)
Vehicle-to-Network (V2N)
Vehicle-to-Pedestrian (V2P)

FIG. 9 illustrates Types of V2X applications to which the present invention may be applied.

These four types of V2X applications may use "cooperative awareness" to provide more intelligent services for end-users.

This means that entities, such as vehicles, roadside infrastructure, application server and pedestrians, may collect knowledge of their local environment (e.g., information received from other vehicles or sensor equipment in proximity) to process and share that knowledge in order to provide more intelligent services, such as cooperative collision warning or autonomous driving.

These intelligent transportation services and the associated message sets have been defined in automotive SDOs outside 3GPP.

Three basic classes of applications for providing ITS services: road safety, traffic efficiency, and other applications may be found in e.g., ETSI TR 102 638 V1.1.1: "Intelligent Transport Systems (ITS); Vehicular Communications; Basic Set of Applications; Definitions."

3GPP only handles the transport of these messages to support different types of V2X applications.

Vehicle-to-Vehicle (V2V) Application

V2V applications expect UEs in proximity of each other to exchange V2V application information.

3GPP transport of messages containing V2V application information requires the UE to have a valid subscription and authorization from a network operator.

Transport for a valid subscriber is provided whether the UE is served or not served by E-UTRAN.

The UE supporting V2V applications transmits messages containing V2V application information (e.g., location, dynamics, and attributes). The message payloads may be flexible in order to accommodate varying amount of information.

3GPP transport of message containing V2V application information is predominantly broadcast-based as illustrated in FIG. 10.

Such 3GPP transport includes the transport between UEs directly and/or, due to the limited direct communication range, the transport between UEs via infrastructure supporting V2X communication, e.g., RSU, application server, etc.

FIG. 10 illustrates Broadcast-based V2V communications to which the present invention may be applied.

Vehicular to Vehicular (V2V)

Three basic classes of applications for providing ITS services: road safety, traffic efficiency, and other applications may be found in ETSI Intelligent Transport System (ITS) specifications.

E-UTRAN allows such UEs that are in proximity of each other to exchange V2V-related information using E-UTRAN when permission, authorization and proximity criteria are fulfilled.

The proximity criteria may be configured by the operator.

The UE supporting V2V applications broadcasts application layer information (e.g., about its position, dynamics, and attributes as part of the V2V service). The V2V payload must be flexible in order to accommodate different information contents, and the information may be broadcasted periodically according to a configuration provided by the operator.

Vehicle-to-Infrastructure (V2I) application

The UE supporting V2I applications transmits messages containing V2I application information to an RSU or locally relevant application server. The RSU and/or the locally relevant application server transmit messages containing V2I application information to one or more UEs supporting V2I applications.

A locally relevant application server serves a particular geographic area. There may be multiple application servers serving overlapping areas, providing the same or different applications.

Vehicle-to-Network (V2N) Application

The UE supporting V2N applications communicates with an application server supporting V2N applications. Both parties communicate with each other via EPS.

Vehicle-to-Pedestrian (V2P) Application

V2P applications expect UEs that are in proximity of each other to exchange V2P application information. 3GPP transport of messages containing V2P application information requires the UE to have a valid subscription and authorization from a network operator. Transport for a valid subscriber is provided whether the UE is served or not served by E-UTRAN.

The UE supporting V2P applications transmits messages containing V2P application information. It is expected that V2P application information may be transmitted either by UE supporting V2X application in a vehicle (e.g., warning to pedestrian), or by UE supporting V2X application associated with a vulnerable road user (e.g., warning to vehicle).

3GPP transport of messages containing V2P application information includes the transport between UEs directly and/or, due to the limited direct communication range, the transport between UEs via infrastructure supporting V2X communication, for example, an RSU or an application server.

The main difference between 3GPP transport of messages with V2P and V2V application information is due to the properties of the UE. A UE supporting V2P applications used by pedestrian might, for example, have lower battery capacity, the radio sensitivity might be limited, for example, due to antenna design, and therefore it may not be able to send messages with the same periodicity as UEs supporting V2V application, and/or receive messages.

Relative Priority of V2X Communication

Subject to regional/national regulatory requirements and operator policies, certain mission critical services (e.g., Public Safety, MPS) may be relatively prioritized over transport of V2X application information. Transport of safety-related V2X application information may be prioritized over transport of non-safety-related V2X application information.

However, in general, it is expected that operator may control relative priorities of different services.

Sidelink Communication Related Identities

Next, a description will be given of Sidelink communication and V2X Sidelink Communication related identities in which the present invention may be applied.

The following identities are used for sidelink communication:

Source Layer-2 ID: Identifies the sender of the data in sidelink communication. The Source Layer-2 ID is 24 bits long and is used together with Destination Layer-2 ID and LCID for identification of the RLC UM entity and PDCP entity in the receiver;

Destination Layer-2 ID: Identifies the target of the data in sidelink communication and V2X sidelink communication. For sidelink communication, the Destination Layer-2 ID is 24 bits long and is split in the MAC layer into two bit strings:

One bit string is the LSB part (8 bits) of Destination Layer-2 ID and forwarded to physical layer as Group Destination ID. This identifies the target of the intended data in sidelink control information and is used for filtering of packets at the physical layer.

Second bit string is the MSB part (16 bits) of the Destination Layer-2 ID and is carried within the MAC header. This is used for filtering of packets at the MAC layer.

In the case of V2X sidelink communication, Destination Layer-2 ID is not split and is carried within the MAC header.

No Access Stratum signalling is required for group formation and to configure Source Layer-2 ID, Destination Layer-2 ID and Group Destination ID in the UE.

These identities are either provided by higher layer or derived from identities provided by higher layer. In the case of groupcast and broadcast, the ProSe UE ID provided by higher layer is used directly as the Source Layer-2 ID and the ProSe Layer-2 Group ID provided by higher layer is used directly as the Destination Layer-2 ID in the MAC layer.

In the case of one-to-one communications, the ProSe UE ID and V2X sidelink communications provided by higher layer is used directly as the Source Layer-2 ID or the Destination Layer-2 ID in the MAC layer.

Support for Sidelink Communication (1) General

Sidelink communication is a mode of communication whereby UEs may communicate with each other directly over the PC5 interface. This communication mode is supported when the UE is served by E-UTRAN and when the UE is outside of E-UTRA coverage.

Only those UEs authorized to be used for public safety operation may perform sidelink communication.

In order to perform synchronization for out of coverage operation UE(s) may act as a synchronization source by transmitting SBCCH and a synchronization signal. SBCCH carries the most essential system information needed to receive other sidelink channels and signals.

SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH; otherwise UE uses pre-configured parameters. SIB18 provides the resource information for synchronization signal and SBCCH transmission.

There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of Sidelink Control period. The Sidelink Control period is the period over which resources allocated in a cell for sidelink control information and sidelink data transmissions occur. Within the Sidelink Control period the UE sends sidelink control information followed by sidelink data.

Sidelink control information indicates a Layer 1 ID and characteristics of the transmissions (e.g., an MCS, the location of resource(s) for a Sidelink Control period, and timing alignment).

The UE performs transmission and reception over Uu and PC5 with the following decreasing priority order in case Sidelink Discovery Gap is not configured:
  Uu transmission/reception (highest priority);
  PC5 sidelink communication transmission/reception;
  PC5 sidelink discovery announcement/monitoring (lowest priority).

The UE performs transmission and reception over Uu and PC5 with the following decreasing priority order in case Sidelink Discovery Gap is configured:
  Uu transmission/reception for RACH;
  PC5 sidelink discovery announcement during a Sidelink Discovery Gap for transmission;
  Non-RACH Uu transmission;
  PC5 sidelink discovery monitoring during a Sidelink Discovery Gap for reception;
  Non-RACH Uu reception;
  PC5 sidelink communication transmission/reception.

(2) Radio Protocol Architecture Hereinafter, the UE radio protocol architecture for sidelink communication is given for the user plane and the control plane.

User Plane

FIG. 11a shows the protocol stack for the user plane, where PDCP, RLC and MAC sublayers (terminate at the other UE) perform the functions listed for the user plane.

FIG. 11a illustrates user-Plane protocol stack for sidelink communication to which the present invention may be applied.

The Access Stratum protocol stack in the PC5 interface consists of PDCP, RLC, MAC and PHY as shown below in FIG. 11a.

User plane details of sidelink communication:
  There is no HARQ feedback for sidelink communication;
  RLC UM is used for sidelink communication;
  A receiving UE needs to maintain at least one RLC UM entity per transmitting peer UE;
  A receiving RLC UM entity used for sidelink communication does not need to be configured prior to reception of the first RLC UMD PDU;
  ROHC Unidirectional Mode is used for header compression in PDCP for sidelink communication.

A UE may establish multiple logical channels. LCID included within the MAC subheader uniquely identifies a logical channel within the scope of one Source Layer-2 ID and Destination Layer-2 ID combination. Parameters for logical channel prioritization are not configured. The Access stratum (AS) is provided with the PPPP of a protocol data unit transmitted over PC5 interface by higher layer. There is a PPPP associated with each logical channel.

Control Plane

A UE does not establish and maintain a logical connection to receiving UEs prior to one-to-many a sidelink communication.

Higher layer establishes and maintains a logical connection for one-to-one sidelink communication including ProSe UE-to-Network Relay operation.

FIG. 11b illustrates control-Plane protocol stack for SBCCH to which the present invention may be applied.

The Access Stratum protocol stack for SBCCH in the PC5 interface consists of RRC, RLC, MAC and PHY as shown below in Figure lib.

The control plane for establishing, maintaining and releasing the logical connection for one-to-one sidelink communication is shown in FIG. 12.

FIG. 12 illustrates control-Plane protocol stack for one-to-one sidelink communication to which the present invention may be applied.

Support for V2X Services

Vehicular communication services, represented by V2X services, may consist of the following four different types: V2V, V2I, V2N and V2P.

Support of V2X services via PC5 interface is provided by V2X sidelink communication, which is a mode of communication whereby UEs may communicate with each other directly over the PC5 interface.

This communication mode is supported when the UE is served by E-UTRAN and when the UE is outside of E-UTRA coverage.

Only the UEs authorised to be used for V2X services may perform V2X sidelink communication.

The user plane protocol stack and functions, as specified in FIG. 11a for sidelink communication, are also used for V2X sidelink communication. In addition, for V2X sidelink communication:
  STCH for sidelink communication is also used for V2X sidelink communication.
  Non-V2X (e.g., Public Safety) data is not multiplexed with V2X data transmitted in resources configured for V2X sidelink communication.

Control plane protocol stack for SBCCH as specified in FIG. 11b for sidelink communication is also used for V2X sidelink communication.

The UE supporting V2X sidelink communication may operate in two modes for resource allocation:
  Scheduled resource allocation, characterized by:
    The UE needs to be RRC_CONNECTED in order to transmit data;
    The UE requests transmission resources from the eNB. The eNB schedules transmission resources for transmission of sidelink control information and data;
  UE autonomous resource selection, characterized by:
    The UE on its own selects resources from resource pools and performs transport format selection to transmit sidelink control information and data;
    If mapping between the zones and V2X sidelink transmission resource pools is configured, the UE selects V2X sidelink resource pool based on the zone UE is located in.
    The UE performs sensing for (re)selection of sidelink resources. Based on sensing results, the UE (re)selects some specific sidelink resources and reserves multiple sidelink resources.

Up to 2 parallel independent resource reservation processes are allowed to be performed by the UE. The UE is also allowed to perform a single resource selection for its V2X sidelink transmission.

Geographical zones may be configured by the eNB or pre-configured. When zones are configured, the world is divided into geographical zones using a single fixed reference point (i.e. geographical coordinates (0, 0)), length and width.

The UE determines the zone identity by means of modulo operation using length and width of each zone, number of zones in length, number of zones in width and the single fixed reference point. The length and width of each zone, number of zones in length and number of zones in width are provided by the eNB when the UE is in coverage and pre-configured when the UE is out of coverage. The zone is configurable for both in coverage and out of coverage.

For in coverage UE, when the UE uses UE autonomous resource selection, the eNB may provide the mapping between zone(s) and V2X sidelink transmission resource pools in SIB21.

For out of coverage UEs, the mapping between the zone(s) and V2X sidelink transmission resource pools may be pre-configured. If a mapping between zone(s) and V2X sidelink transmission resource pool is (pre-)configured, the UE selects transmission sidelink resources from the resource pool corresponding to the zone where it is currently located. The zone concept is not applied to exceptional V2X sidelink transmission pools as well as reception pools. Resource pools for V2X sidelink communication are not configured based on priority.

For V2X sidelink transmission, during handover, transmission resource pool configurations including exceptional transmission resource pool for the target cell may be signaled in the handover command to reduce the transmission interruption, so that the UE may use the transmission sidelink resource pools of the target cell before the handover is completed as long as synchronization is performed with the target cell.

If the exceptional transmission resource pool is included in the handover command, the UE starts using randomly selected resources from the exceptional transmission resource pool starting from the reception of handover command. If the UE is configured with scheduled resource allocation in the handover command, the UE continues to use the exceptional transmission resource pool while the timer associated with handover is running. If the UE is configured with autonomous resource selection in the target cell the UE continues to use the exceptional transmission resource pool until the initial sensing is completed on the transmission resource pools for autonomous resource selection.

For exceptional cases (e.g., during RLF, during transition from RRC IDLE to RRC CONNECTED or during change of dedicated sidelink resource pools within a cell), the UE may select resources in the exceptional pool provided in serving cell's SIB21 based on sensing, and uses them temporarily.

In order to avoid interruption time in receiving V2X messages due to delay in acquiring reception pools broadcasted from the target cell, synchronization configuration and reception resource pool configuration for the target cell may be signaled to RRC_CONNECTED UEs in the handover command. For RRC_IDLE UE, it is up to UE implementation to minimize sidelink transmission/reception interruption time associated with acquisition of SIB21 of the target cell.

A UE is considered in-coverage on the carrier used for V2X sidelink communication whenever it detects a cell on that carrier as per criteria. If the UE that is authorized for V2X sidelink communication is in-coverage for V2X sidelink communication it may use scheduled resource allocation or UE autonomous resource selection as per eNB configuration.

A set of transmission and reception resource pools for data when the UE is out of coverage for V2X sidelink communication is pre-configured in the UE. V2X sidelink communication resources are not shared with other non-V2X applications transmitted over sidelink.

An RRC_CONNECTED UE may send a Sidelink UE Information message to the serving cell if it is interested in V2X communication transmission in order to request sidelink resources.

If the UE is configured by higher layers to receive V2X communication and PC5 resources are provided, the UE receives on those configured resources.

The serving cell may provide synchronization configuration for the carrier used for V2X sidelink communication. In this case, the UE follows the synchronization configuration received from serving cell. In case there is no cell detected on the carrier used for V2X sidelink communication and the UE does not receive synchronization configuration from serving cell, the UE follows preconfigured synchronization configuration. There are three types of synchronization reference, namely eNB, UE and GNSS. In case GNSS is configured as synchronization source, the UE utilizes the UTC time to calculate direct frame number and subframe number. In case eNB timing is configured as synchronization reference to the UE for dedicated carrier for V2X, the UE follows PCell (RRC_CONNECTED)/serving cell (RRC_IDLE) for synchronization and DL measurements.

Hereinafter, transport layer-based methods to provide location tracking services using V2X communications, which are proposed according to embodiments of the present invention, are described in detail with reference to Figures.

One authorized vehicle (or its driver/passenger(s)) needs to keep track of the current location (or the history of the locations, trajectory) of another vehicle.

Location tracking services may be provided using the application layers (APPs), such as using Google map interface.

However, it has some drawbacks. For example, data channels (data radio bearers) are usually used to convey tracking request and response for the methods that involve the application layers.

In other words, the application layer cannot avoid using data channel to provide input or to receive the cloud-based computing results regarding the location.

To use the data channel, UE that is currently in IDLE mode must get into CONNECTED mode by performing Random Access and have to go through associated barring process(es). If the serving network has ACDC (Application-specific Control for Data Communication) activated, the UE's in that affected areas, cannot easily get the location information through the use of data channel-based mechanism.

It will suffer from limited coverage areas, reliability, and delay when the traffic load is high. In turn, it is not suitable for real-time tracking in some situations.

The present invention provides transport layer-based methods to provide location tracking services using V2X communications that may work even when data channels are congested due to some reasons (e.g., overload of traffic, disastrous event, etc.), in which case the existing methods are heavily disturbed.

Before considering a method for providing a location tracking service using the v2x communication proposed in the present specification, the following pre-conditions are assumed.

<Pre-Condition>
A police car (Vehicle A) has found a vehicle (Vehicle B) used/operated by a suspected criminal.
Vehicle A and Vehicle B are V2X Service enabled.
RSU are deployed in the area of interest (e.g., in the metropolitan area of New York City, in which both vehicles will move around in this example).
Vehicle B is trying to escape, attempting to have its location not exposed to Vehicle A (or the police).
Vehicle A needs to keep track of the location of Vehicle B.
Vehicle B transmits V2X related message(s).
Vehicle A monitors the signal coming from Vehicle B.
Vehicle A processes to detect the signal coming from Vehicle B.

FIG. 13 is a flowchart showing an example of a method for tracking a location using V2X communication, which is proposed according to an embodiment of the present invention.

First, a first vehicle UE (V-UE 1) transmits a first message for requesting information related to the location of a second vehicle UE (V-UE 2) to a first network entity (Network entity 1) (S1301).

The information related to the location of the second vehicle UE may be expressed as first control information.

The first control information may include information about the ID of the second vehicle UE.

In this case, the ID information is indicative of the identifier (ID) of the second vehicle UE, and may be the vehicle identification number (VIN) or plate number of the second vehicle UE.

Furthermore, the vehicle UE may be expressed as a vehicle terminal, a V-UE or a vehicle.

Furthermore, the first message is a message transmitted by a vehicle through infrastructure (e.g., an eNB-type RSU/MME) and may be expressed as a V2I message.

Furthermore, the first network entity is indicative of the network entity of the first vehicle UE and may also be expressed as a first network node.

The first network entity may mean an eNB-type RSU/MME for the first vehicle UE.

Furthermore, the first network entity may be provided by a service provider or a service operator.

Thereafter, the first network entity transmits the received first message to a third network entity (Network entity 3) (S1302).

The third network entity may be expressed a service center, a service server or a third network node.

Thereafter, the third network entity tracks a second network entity (Network entity 2) in order to trace the location of the second vehicle UE (S1303).

The second network entity is indicative of the network entity of the second vehicle UE and may also be expressed as a second network node.

The second network entity may mean an eNB-type RSU/MME for the second vehicle UE.

Furthermore, the second network entity may be provided by a service provider or a service operator.

The first network entity and the second network entity may be managed by different service providers or the same service provider.

That is, the third network entity transmits a second message for tracing the location of the second vehicle UE to the second network entity (based on the transport layer) (S1304).

The second message may include first control information related to the tracking of the location of the second vehicle UE.

The first control information includes at least one of the ID of vehicle UE to be traced (e.g., the ID (V2X ID) of the second vehicle UE) and V2X tracking service indication information indicative of whether there is a tracking service request for V2X.

The indication information may be indicative of an on or off value.

The first control information may be expressed as a tracking service request message. The format of the tracking service request message may be the same as Table 6 below.

Furthermore, the second message may be a paging message.

The paging message may have a broadcast type and a unicast type. If the paging message has the broadcast type, an example of the message format may be the same as that of Table 7.

However, the message format of Table 7 may also be applied to the paging message of the unicast type.

If the third network entity transmits the paging message of the unicast type, it may maintain a vehicle-specific identification.

For example, if a V2X service is registered, an International Mobile Subscriber Identity (IMSI) for a specific vehicle may be mapped to the VIN of the specific vehicle.

That is, if the third network entity is provided with the VIN of the second vehicle UE through the first vehicle UE, the third network entity may page the second vehicle UE using an IMSI corresponding to the VIN of the second vehicle UE.

The third network entity may be construed as the third network entity for the second vehicle UE.

If the paging message including the V2X tracking service indication information is transmitted in the broadcast type, all of pieces of vehicle UE within a paging area search for or discover a resource part including information about a vehicle whose location is to be traced.

The resource part information may be previously set as an RB #10 within a fourth subframe after a subframe that has (or receives) the paging indication included in the paging message.

Furthermore, the resource part information may be included in the paging indication.

Vehicle UE corresponding to the ID of the resource part transmits a third message as a response to the second message.

Thereafter, the second network entity transfers the received second message to the second vehicle UE (S1305).

Thereafter, when the second message is received from the second network entity, the second vehicle UE checks its own power availability and/or service coverage (S1306).

The checking of the service coverage may include a procedure for checking whether the second vehicle UE is served by an E-UTRAN or not.

The E-UTRAN may be expressed as a cellular network.

If the second vehicle UE is served by the E-UTRAN at step S1306, the second vehicle UE may transmit a third message to the second network entity a response to the second message (S1307).

The third message may include second control information related to the location of the second vehicle UE.

The second control information may include at least one of V2X accessory information and time stamp information indicative of the time when location information or location coordinates indicative of the location coordinates of the second vehicle UE is obtained.

The V2X accessory information may include a fuel level (or a charging level), the number of passengers, etc.

In this case, the fuel level (or charging level) may be combined with the trajectory of location information of the vehicle, speed of the vehicle, fuel efficiency of the vehicle, future direction estimation of the vehicle and so on.

The second control information may be expressed a tracking service response message. The format of the tracking service response message may be the same as that of Table 9.

Furthermore, the third message may be a UE information response (UEInformationResponse) message. The format of the UE information response (UEInformationResponse) message may be the same as that of Table 10.

In this case, the second vehicle UE may transmit the third message by additionally taking into consideration its power availability.

Furthermore, the second vehicle UE may continue to transmit the third message.

If the second vehicle UE is not served by the E-UTRAN at step S1306, the second vehicle UE stores related location information if power is still available (S1308).

That is, the second vehicle UE may store pieces of information included in the second control information.

Thereafter, when the second vehicle UE enters an area served by the E-UTRAN, the second vehicle UE transmits the location information or second control information stored (in the memory) to the second network entity (S1307).

Furthermore, V2X service-capable UE of the second vehicle UE may continue to transmit the third message although the engine of the second vehicle UE has been off.

Thereafter, the second network entity transmits the received third message to the third network entity (S1309).

Thereafter, the third network entity transmits a fourth message, including information related to the location of the second vehicle UE, to the first network entity (S1310).

The fourth message may be a message corresponding to the first message.

Accordingly, the fourth message may be expressed as a V2I message.

Thereafter, the first network entity transmits the received fourth message to the first vehicle UE (S1311).

FIG. 14 is a flowchart showing another example of a method for tracking a location using V2X communication, which is proposed according to an embodiment of the present invention.

FIG. 14 shows a process in which the vehicle A tracks the location of the vehicle B using the V2X communication, and assumes a pre-condition as described above.

Referring to FIG. 14, a vehicle A (or V-UE 1) transmits information about the ID of a vehicle B (or V-UE 2) to a service center (S1410).

In this case, the ID information is indicative of the identifier (ID) of the vehicle B and may be the vehicle identification number (VIN) or plate number of the vehicle B.

As is described later with reference to FIG. 15, the ID information of the vehicle B may be transmitted to service center through the operator (e.g., an eNB-type RSU/MME) of the vehicle A.

Thereafter, the service center transmits a tracking service request message for tracking the location of the vehicle B to the vehicle B (based on the transport layer).

The operation of the service center is described in more detail below in relation to the transmission of the tracking service request message.

First, after step S1410, the service center tracks the operator of the vehicle B (S1420).

Thereafter, the service center transmits the tracking service request message, received at step S1410, to the operator of the vehicle B (S1430).

In this case, the tracking service request message may be transmitted through a paging message.

Thereafter, the operator of the vehicle B transfers the received tracking service request message to the vehicle B (S1440).

In this case, the operator of the vehicle B may be an entity in which an MME, a BS-type RSU or an MME and an eNB-type RSU have been together implemented.

Thereafter, if the tracking service request message is received from the operator of the vehicle B, the vehicle B checks its own power availability and/or service coverage (S1450).

The checking of the service coverage may include a procedure for checking whether the vehicle B is served by an E-UTRAN or not (S1460).

If, as a result of the check, it is found that the vehicle B is served by the E-UTRAN, the vehicle B may immediately transmit a tracking service response message to the operator of the vehicle B as a response to the tracking service request message (S1480).

In this case, the vehicle B may transmit the tracking service response message by additionally taking into consideration the power availability.

Furthermore, the vehicle B continues to transmit the tracking service response message.

If, as a result of the check, it is found that the vehicle B is not served by the E-UTRAN, the vehicle B stores location information related to the vehicle B if power is still available (S1470).

Thereafter, when the vehicle B enters an area served by the E-UTRAN, the vehicle B transmits the stored location information to the operator of the vehicle B (S1480).

In this case, the stored location information may be included in the tracking service response message.

Furthermore, V2X service-capable UE of the vehicle B may continue to transmit the tracking service response message although the engine of the vehicle B is off.

Thereafter, the operator of the vehicle B transmits the received tracking service response message to the service center (S1490).

FIG. 15 is a flowchart showing another example of a method for tracking a location using V2X communication, which is proposed according to an embodiment of the present invention.

That is, FIG. 15 shows one embodiment of the present invention with the entities involved and with the messages exchanged. It is noted that V2X service providers for V-UE1 and V-UE2 are different for illustration purpose. Common service provider may support both V-UE1 and V-UE2.

The eNB-type RSU/MME managed by V2X service provider for V-UE1 may be represented as a first network entity, and the eNB-type RSU/MME managed by V2X service provider for V-UE2 may be represented as a second network entity.

Referring to, the V-UE1 (e.g., in an authority body) requests the location of V-UE2 (e.g., civilian) using V2I message through the first network entity (eNB-type RSU/MME managed by V2X service provider for V-UE1) (S1510).

The V2I message may include the identity of V-UE2 (e.g., a VIN number or a plate number).

The first network entity (eNB-type RSU/MME managed by V2X service provider for V-UE1) delivers the V2I message to the service center for tracking (S1520).

The service center may be operated by the service provider itself or third party.

The service center may be represented as a third network entity, a service server, etc.

The service center identifies the second network entity (V2X service provider for V-UE2) (S1530) and delivers the tracking request to the second network entity (S1540).

The service provider for V-UE2 pages the Tracking Service Request message through its eNB-type RSUs/MMEs.

That is, the second network entity transmits the Tracking Service Request message.

After receiving the Tracking Service Request message with its identity (S1550), the V-UE2 responds with a Tracking Service Response message to the service center (S1560).

Furthermore, the Tracking Service Response message may be transmitted via a paging message.

The service center delivers the location information of V-UE2 to V-UE1 through the first network entity (service provider for V-UE1) using V2I message (S1570).

The Tracking Service Request message may be delivered using broadcast- and/or unicast-type paging message.

When in using broadcast-type paging message (as in Paging message table 6 below), the paging indication for V2X tracking is broadcast through the paging area(s).

All vehicles that successfully received the paging indication look for the portion of the resource(s) (e.g., assigned resource block(s) (RB(s)) in PDSCH) that contains the vehicle information being tracked for.

Information on the portion of the resource(s) may be preset (e.g., RB #10 in the 4th sub-frame after the sub-frame with paging indication) or may be included in the paging indication.

The vehicle that corresponds to the identity in the resource will respond using the Tracking Service Response message with the information listed in Tracking Service Response message format described below (as in UEInformationResponse message).

In order to use unicast-type paging procedure, V2X service providers may maintain vehicular-specific identifications.

For example, when the V2X service is enrolled, IMSI for specific vehicle may be mapped with vehicle identification number (VIN) (or other forms of uniquely identifiable ID of vehicle).

In the above embodiment, if VIN (or other forms of uniquely identifiable ID of vehicle) for V-UE2 is provided by V-UE1, the V2X service provider for V-UE2 pages for V-UE2 using IMSI corresponding to VIN (or other forms of uniquely identifiable ID of vehicle) for V-UE2.

Then, using Tracking Service Response message, V-UE2 delivers its location information with the information listed in Tracking Service Response message format described below (as in UEInformationResponse message).

The message formats (Tracking Service Request message, Tracking Service Response message) are as described below.

Table 6 illustrates an example of Tracking Service Request message format.

TABLE 6

Tracking Service Request message format:
V2X ID:
Tracking Service Request flag: ON or OFF The Tracking Service Request message may be transmitted via a paging message.

Table 7 illustrates an example of paging message.

TABLE 7

```
-- ASN1START
Paging ::=                       SEQUENCE {
    pagingRecordList                 PagingRecordList              OPTIONAL, --
Need ON
    systemInfoModification           ENUMERATED {true}             OPTIONAL, --
Need ON
    etws-Indication                  ENUMERATED {true}             OPTIONAL, --
Need ON
    nonCriticalExtension             Paging-v890-IEs               OPTIONAL
}
Paging-v890-IEs ::=              SEQUENCE {
    lateNonCriticalExtension         OCTET STRING                  OPTIONAL,
    nonCriticalExtension             Paging-v920-IEs                         OPTIONAL
}
Paging-v920-IEs ::=              SEQUENCE {
    cmas-Indication-r9               ENUMERATED {true}             OPTIONAL, --
Need ON
    nonCriticalExtension             Paging-v1130-IEs              OPTIONAL
}
Paging-v1130-IEs ::=             SEQUENCE {
    eab-ParamModification-r11        ENUMERATED {true}             OPTIONAL, --
Need ON
    nonCriticalExtension             SEQUENCE { }                  OPTIONAL
}
Paging-v140-IEs ::=              SEQUENCE {
    v2xTrackingService-Indication            ENUMERATED {true}
    OPTIONAL, -- Need ON
    nonCriticalExtension             SEQUENCE { }                  OPTIONAL
}
PagingRecordList ::=             SEQUENCE (SIZE (1..maxPageRec))   OF
PagingRecord
```

TABLE 7-continued

```
PagingRecord ::=                    SEQUENCE {
    ue-Identity                         PagingUE-Identity,
    cn-Domain                           ENUMERATED  {ps, cs},
    ...
}
PagingUE-Identity ::=               CHOICE {
    s-TMSI                              S-TMSI,
    imsi                                IMSI,
    v2xueid                             V2XUEID,    //optional
    ...
}
IMSI ::=                            SEQUENCE (SIZE (6..21)) OF IMSI-Digit
IMSI-Digit ::=                      INTEGER (0..9)
-- ASN1STOP
```

Table 8 illustrates an example of paging fields included in the paging message.

TABLE 8

Paging field descriptions cmas-Indication

If present: indication of a CMAS notification.
cn-Domain

Indicates the origin of paging.
eab-ParamModification

If present: indication of an EAB parameters (SIB14) modification.
v2xTrackingService-Indication If present: indication of a Tracking Service Request for V2X
etws-Indication If present: indication of an ETWS primary notification and/or ETWS secondary notification.
imsi The International Mobile Subscriber Identity, a globally unique permanent subscriber identity, see TS 23.003 [27]. The first element contains the first IMSI digit, the second element contains the second IMSI digit and so on.
v2xueid The International Mobile Subscriber Identity for V2X UE, a globally unique permanent subscriber identity (V2X ID).
systemInfoModification If present: indication of a BCCH modification other than SIB10, SIB11, SIB12 and SIB14.
ue-Identity Provides the NAS identity of the UE that is being paged.

Table 9 illustrates an example of Tracking Service Response message format.

TABLE 9

Tracking Service Response message format:
V2X ID; // Vehicle's profile information (other types)
Location coordinates: <[l]bits (X- coordinate), [m]bits, Y-coordinate), [n]bits, Z-coordinate)>;
    (or alternatively, <[l]bits (X- coordinate), [m]bits, Y-coordinate)>)
Time of the coordinates;
A series of the past [k] location coordinates and the corresponding time-stamps;V2X accessory information; // the fuel level (the charging level), number of passengers (whichever available);

A location coordinate has time-stamp describing the time when the coordinate was obtained.

The Tracking Service Response message may be transmitted via UEInformationResponse.

In the above message format, the fuel level (the charging level) and number of passengers are noted in V2X accessory information, but other information may be inclusive.

Information on the fuel level and the number of passengers may be used by law enforcement authority for further protection.

For example, the fuel level in conjunction with trajectory location information, speed, fuel efficiency of the car, the estimation of future direction, and etc. may be used by the authority to deploy the necessary law enforcement to possible future locations to prevent further harmful impacts to the public.

A series of the past [k] location coordinates and the corresponding time-stamps may show what routes were taken by the vehicle at given times.

The UEInformationResponse message is used by the UE to transfer the information requested by the E-UTRAN.

Signaling radio bearer: SRB1 or SRB2 (when logged measurement information is included)
RLC-SAP: AM
Logical channel: DCCH
Direction: UE to E-UTRAN Table 10 illustrates an example of UEInformationResponse message.

TABLE 10

```
-- ASN1START
UEInformationResponse-r9 ::=        SEQUENCE {
    rrc-TransactionIdentifier           RRC-TransactionIdentifier,
    criticalExtensions                  CHOICE {
        c1                                  CHOICE {
            ueInformationResponse-r9            UEInformationResponse-r9-IEs,
            spare3 NULL, spare2 NULL, spare1 NULL
        },
        criticalExtensionsFuture            SEQUENCE { }
    }
}
```

TABLE 10-continued

```
UEInformationResponse-r9-IEs ::=         SEQUENCE {
    rach-Report-r9                           SEQUENCE {
        numberOfPreamblesSent-r9                 NumberOfPreamblesSent-r11,
        contentionDetected-r9                    BOOLEAN
    }                                                                        OPTIONAL,
    rlf-Report-r9                            RLF-Report-r9                   OPTIONAL,
    nonCriticalExtension                     UEInformationResponse-v930-IEs
        OPTIONAL
}
-- Late non critical extensions
UEInformationResponse-v9e0-IEs ::=       SEQUENCE {
    rlf-Report-v9e0                          RLF-Report-v9e0                 OPTIONAL,
    nonCriticalExtension                     SEQUENCE { }                    OPTIONAL
}
-- Regular non critical extensions
UEInformationResponse-v930-IEs ::=       SEQUENCE {
    lateNonCriticalExtension                 OCTET STRING (CONTAINING
UEInformationResponse-v9e0-IEs)      OPTIONAL,
    nonCriticalExtension                     UEInformationResponse-v1020-IEs
        OPTIONAL
}
UEInformationResponse-v1020-IEs      ::= SEQUENCE {
    logMeasReport-r10                        LogMeasReport-r10               OPTIONAL,
    nonCriticalExtension                     UEInformationResponse-v1130-IEs
        OPTIONAL
}
UEInformationResponse-v1130-IEs      ::= SEQUENCE {
    connEstFailReport-r11                    ConnEstFailReport-r11           OPTIONAL,
    nonCriticalExtension                     UEInformationResponse-v12xy-IEs     OPTIONAL
}
UEInformationResponse-v12xy-IEs      ::= SEQUENCE {
    mobilityHistoryReport-r12                MobilityHistoryReport-r12       OPTIONAL,
    nonCriticalExtension                     SEQUENCE { }                    OPTIONAL
}
UEInformationResponse-v14xy-IEs      ::= SEQUENCE {
    trackingServiceResponse-r14              TrackingServiceResponse-r14
        OPTIONAL,
    nonCriticalExtension                     SEQUENCE { }                    OPTIONAL
}
RLF-Report-r9 ::=                        SEQUENCE {
    measResultLastServCell-r9                SEQUENCE {
        rsrpResult-r9                            RSRP-Range,
        rsrqResult-r9                            RSRQ-Range                  OPTIONAL
    },
    measResultNeighCells-r9                  SEQUENCE {
        measResultListEUTRA-r9                   MeasResultList2EUTRA-r9
            OPTIONAL,
        measResultListUTRA-r9                    MeasResultList2UTRA-r9      OPTIONAL,
        measResultListGERAN-r9                   MeasResultListGERAN         OPTIONAL,
        measResultsCDMA2000-r9                   MeasResultList2CDMA2000-r9
            OPTIONAL
    }   OPTIONAL,
    ...,
    [[ locationInfo-r10                      LocationInfo-r10                OPTIONAL,
        failedPCellId-r10                        CHOICE {
            cellGlobalId-r10                         CellGlobalIdEUTRA,
            pci-arfcn-r10                            SEQUENCE {
                physCellId-r10                           PhysCellId,
                carrierFreq-r10                          ARFCN-ValueEUTRA
            }
        }                                                                    OPTIONAL,
        reestablishmentCellId-r10                CellGlobalIdEUTRA           OPTIONAL,
        timeConnFailure-r10                      INTEGER (0..1023)           OPTIONAL,
        connectionFailureType-r10                ENUMERATED {rlf, hof}       OPTIONAL,
        previousPCellId-r10                      CellGlobalIdEUTRA           OPTIONAL
    ]],
    [[ failedPCellId-v1090                   SEQUENCE {
        carrierFreq-v1090                        ARFCN-ValueEUTRA-v9e0
    }                                                                        OPTIONAL
    ]],
    [[ basicFields-r11                       SEQUENCE {
        c-RNTI-r11                               C-RNTI,
        rlf-Cause-r11                            ENUMERATED {
                                                 t310-Expiry, randomAccessProblem,
                                                 rlc-MaxNumRetx, spare1},
        timeSinceFailure-r11                     TimeSinceFailure-r11
    }                                                                        OPTIONAL,
        previousUTRA-CellId-r11                  SEQUENCE {
            carrierFreq-r11                          ARFCN-ValueUTRA,
            physCellId-r11                           CHOICE {
```

TABLE 10-continued

```
            fdd-r11                     PhysCellIdUTRA-FDD,
            tdd-r11                     PhysCellIdUTRA-TDD
        },
        cellGlobalId-r11                CellGlobalIdUTRA                OPTIONAL
    }                                                                   OPTIONAL,
        selectedUTRA-CellId-r11         SEQUENCE {
            carrierFreq-r11             ARFCN-ValueUTRA,
            physCellId-r11              CHOICE {
                fdd-r11                     PhysCellIdUTRA-FDD,
                tdd-r11                     PhysCellIdUTRA-TDD
            }
        }                                                               OPTIONAL
    ]]
}
RLF-Report-v9e0 ::=             SEQUENCE {
    measResultListEUTRA-v9e0        MeasResultList2EUTRA-v9e0
}
MeasResultList2EUTRA-r9 ::=             SEQUENCE (SIZE (1..maxFreq)) OF
MeasResult2EUTRA-r9
MeasResultList2EUTRA-v9e0 ::=           SEQUENCE (SIZE (1..maxFreq)) OF
MeasResult2EUTRA-v9e0
MeasResult2EUTRA-r9 ::=         SEQUENCE {
    carrierFreq-r9                  ARFCN-ValueEUTRA,
    measResultList-r9               MeasResultListEUTRA
}
MeasResult2EUTRA-v9e0 ::=       SEQUENCE {
    carrierFreq-v9e0                    ARFCN-ValueEUTRA-v9e0           OPTIONAL
}
MeasResultList2UTRA-r9 ::=              SEQUENCE (SIZE (1..maxFreq))            OF
MeasResult2UTRA-r9
MeasResult2UTRA-r9 ::=          SEQUENCE {
    carrierFreq-r9                  ARFCN-ValueUTRA,
    measResultList-r9               MeasResultListUTRA
}
MeasResultList2CDMA2000-r9 ::=          SEQUENCE (SIZE (1..maxFreq))            OF
MeasResult2CDMA2000-r9
MeasResult2CDMA2000-r9 ::=              SEQUENCE {
    carrierFreq-r9                  CarrierFreqCDMA2000,
    measResultList-r9               MeasResultsCDMA2000
}
LogMeasReport-r10 ::=           SEQUENCE {
    absoluteTimeStamp-r10           AbsoluteTimeInfo-r10,
    traceReference-r10              TraceReference-r10,
    traceRecordingSessionRef-r10    OCTET STRING (SIZE (2)),
    tce-Id-r10                      OCTET STRING (SIZE (1)),
    logMeasInfoList-r10             LogMeasInfoList-r10,
    logMeasAvailable-r10            ENUMERATED {true}                   OPTIONAL,
    ...
}
LogMeasInfoList-r10 ::=         SEQUENCE (SIZE (1..maxLogMeasReport-r10) ) OF
LogMeasInfo-r10
LogMeasInfo-r10 ::=     SEQUENCE {
    locationInfo-r10                LocationInfo-r10                    OPTIONAL,
    relativeTimeStamp-r10           INTEGER (0..7200),
    servCellIdentity-r10            CellGlobalIdEUTRA,
    measResultServCell-r10          SEQUENCE {
        rsrpResult-r10                  RSRP-Range,
        rsrqResult-r10                  RSRQ-Range
    },
    measResultNeighCells-r10        SEQUENCE {
        measResultListEUTRA-r10             MeasResultList2EUTRA-r9
OPTIONAL,
        measResultListUTRA-r10          MeasResultList2UTRA-r9          OPTIONAL,
        measResultListGERAN-r10         MeasResultList2GERAN-r10            OPTIONAL,
        measResultListCDMA2000-r10      MeasResultList2CDMA2000-r9
OPTIONAL
    } OPTIONAL,
    ...,
    [[ measResultListEUTRA-v1090      MeasResultList2EUTRA-v9e0         OPTIONAL
    ]]
}
MeasResultList2GERAN-r10 ::=            SEQUENCE (SIZE (1..maxCellListGERAN)) OF
MeasResultListGERAN
ConnEstFailReport-r11 ::=               SEQUENCE {
    failedCellId-r11                CellGlobalIdEUTRA,
    locationInfo-r11                LocationInfo-r10                    OPTIONAL,
    measResultFailedCell-r11        SEQUENCE {
        rsrpResult-r11                  RSRP-Range,
        rsrqResult-r11                  RSRQ-Range                      OPTIONAL
    },
```

TABLE 10-continued

```
    measResultNeighCells-r11            SEQUENCE {
        measResultListEUTRA-r11             MeasResultList2EUTRA-r9
OPTIONAL,
        measResultListUTRA-r11              MeasResultList2UTRA-r9          OPTIONAL,
        measResultListGERAN-r11             MeasResultListGERAN
OPTIONAL,
        measResultsCDMA2000-r11             MeasResultList2CDMA2000-r9
OPTIONAL
    }   OPTIONAL,
    numberOfPreamblesSent-r11           NumberOfPreamblesSent-r11,
    contentionDetected-r11              BOOLEAN,
    maxTxPowerReached-r11               BOOLEAN,
    timeSinceFailure-r11                TimeSinceFailure-r11,
    measResultListEUTRA-v1130           MeasResultList2EUTRA-v9e0       OPTIONAL,
    ...
}
NumberOfPreamblesSent-r11 ::=           INTEGER (1..200)
TimeSinceFailure-r11 ::=                INTEGER (0..172800)
MobilityHistoryReport-r12 ::=           VisitedCellInfoList-r12
TrackingServiceResponse-r14 ::=             SEQUENCE {
    timeStamp-r14                       TimeStamp, // time, time zone info;
    locationInfo-r14                    LocationInfo-r14
    fuelLevelInfo-r14                   FuelLevelInfo -r14              OPTIONAL
    passengerLoadInfo-r14               PassengerLoadInfo -r14              OPTIONAL
    nextTrackingServiceResponse-r14         SEQUENCE {
    timeStamp-r14                       TimeStamp, // time, time zone info;
    locationInfo-r14                    LocationInfo-r14
    }
    ... // nextTrackingServiceReponse (series of (location,time) info)
}
-- ASN1STOP
```

Table 11 illustrates an example of UEInformationResponse fields included in the UEInformationResponse message.

TABLE 11

| UEInformationResponse field descriptions |
|---|
| absoluteTimeStamp |
| Indicates the absolute time when the logged measurement configuration logging is provided, as indicated by E-UTRAN within absoluteTimeInfo. |
| carrierFreq |
| In case the UE includes carrierFreq-v9e0 and/or carrierFreq-v1090, the UE shall set the corresponding entry of carrierFreq-r9 and/or carrierFreq-r10 respectively to maxEARFCN. For E-UTRA and UTRA frequencies, the UE sets the ARFCN according to the band used when obtaining the concerned measurement results. |
| connectionFailureType |
| This field is used to indicate whether the connection failure is due to radio link failure or handover failure. |
| contentionDetected |
| This field is used to indicate that contention was detected for at least one of the transmitted preambles, see TS 36.321 [6]. |
| c-RNTI |
| This field indicates the C-RNTI used in the PCell upon detecting radio link failure or the C-RNTI used in the source PCell upon handover failure. |
| failedCellId |
| This field is used to indicate the cell in which connection establishment failed. |
| failedPCellId |
| This field is used to indicate the PCell in which RLF is detected or the target PCell of the failed handover. The UE sets the EARFCN according to the band used for transmission/reception when the failure occurred. |

TABLE 11-continued

| UEInformationResponse field descriptions |
|---|
| maxTxPowerReached |
| This field is used to indicate whether or not the maximum power level was used for the last transmitted preamble, see TS 36.321 [6]. |
| measResultFailedCell |
| This field refers to the last measurement results taken in the cell, where connection establishment failure happened. |
| measResultLastServCell |
| This field refers to the last measurement results taken in the PCell, where radio link failure or handover failure happened. |
| measResultListEUTRA |
| If measResultListEUTRA-v9e0, measResultListEUTRA-v1090 or measResultListEUTRA-v1130 is included, the UE shall include the same number of entries, and listed in the same order, as in measResultListEUTRA-r9, measResultListEUTRA-r10 and/or measResultListEUTRA-r11 respectively. |
| mobilityHistoryReport |
| This field is used to indicate the time of stay in 16 most recently visited E-UTRA cells or of stay out of E-UTRA. |
| TrackingServiceResponse |
| This field is used to indicate the time and coordinates in [XX] most recently stored location info.<br>[XX] can be a whole number, e.g., 1, 2, . . . , 8, . . . 16, . . . 32, . . . etc |
| numberOfPreamblesSent |
| This field is used to indicate the number of RACH preambles that were transmitted. Corresponds to parameter PREAMBLE_TRANSMISSION_COUNTER in TS 36.321 [6]. |
| previousPCellId |
| This field is used to indicate the source PCell of the last handover (source PCell when the last RRC-Connection-Reconfiguration message including mobilityControlInfowas received). |

TABLE 11-continued

UEInformationResponse field descriptions previousUTRA-CellId

This field is used to indicate the source UTRA cell of the last successful handover to E-UTRAN, when RLF occurred at the target PCell. The UE sets the ARFCN according to the band used for transmission/reception on the concerned cell.
reestablishmentCellId This field is used to indicate the cell in which the re-establishment attempt was made after connection failure.
relativeTimeStamp Indicates the time of logging measurement results, measured relative to the absoluteTimeStamp. Value in seconds.
rlf-Cause This field is used to indicate the cause of the last radio link failure that was detected. In the case of handover failure information reporting (i.e., the connectionFailureType is set to 'hof'), the UE is allowed to set this field to any value.
selectedUTRA-CellId This field is used to indicate the UTRA cell that the UE selects after RLF is detected, while T311 is running. The UE sets the ARFCN according to the band selected for transmission/reception on the concerned cell.
tce-Id Parameter Trace Collection Entity Id: See TS 32.422 [58].
timeConnFailure This field is used to indicate the time elapsed since the last HO initialization until connection failure. Actual value = IE value * 100 ms. The maximum value 1023 means 102.3 s or longer.
timeSinceFailure This field is used to indicate the time that elapsed since the connection (establishment) failure. Value in seconds. The maximum value 172800 means 172800 s or longer.
traceRecordingSessionRef Parameter Trace Recording Session Reference: See TS 32.422 [58].

FIG. 16 is a flowchart showing another example of a method for tracking a location using V2X communication, which is proposed according to an embodiment of the present invention.

First, a second vehicle UE receives a second message from a second network entity (S1610).

The second message may include first control information related to the tracking of the location of the second vehicle UE.

The first control information may include at least one of information about the ID of the second vehicle UE and tracking service indication information indicating whether a tracking service request is present or not.

The second network entity is a network entity related to the second vehicle UE.

The second network entity may include an eNB-type road side unit (RSU) and a mobility management entity (MME).

The second message may be a paging message.

If the second message is a paging message of a unicast type, the information about the ID of the second vehicle UE may be an international mobile subscriber identity (IMSI) mapped to the vehicle identification number (VIN) of the second vehicle UE.

Furthermore, the paging message may include paging indication as described above.

The resource region of the first control information may be previously set as a specific resource block (RB) within a fourth subframe after a subframe in which the paging indication is received.

The specific RB may be an RB #10.

Thereafter, the second vehicle UE checks whether it is served by a cellular network (S1620).

Thereafter, the second vehicle UE identifies its own ID included in the received second message (S1630).

Thereafter, if the second vehicle UE is served by a cellular network, the second vehicle UE transmits a third message, including second control information related to the location of the second vehicle UE, to the second network entity (S1640).

The second control information may include at least one of location information indicative of the location coordinates of the second vehicle UE, time stamp information indicative of the time when the location coordinates are obtained, and V2X accessory information.

The V2X accessory information may include a fuel level of the vehicle or the number of passengers of the vehicle.

The fuel level of the vehicle may be combined with at least one of the trajectory of location information of the vehicle, speed of the vehicle, fuel efficiency of the vehicle, and future direction estimation of the vehicle.

In this case, if the second vehicle UE is not served by a cellular network, the second vehicle UE may store the second control information in its memory.

The second vehicle UE may receive information indicative of the storage of the second control information from the second network entity before it is served by the cellular network.

The second control information may be stored by taking into consideration of the power availability of the second vehicle UE.

If the second vehicle UE enters the cellular network (i.e., if the second vehicle UE is served by the cellular network), it may transmit the stored second control information to the second network entity.

The third message may be transmitted by V2X service-capable UE related to the second vehicle UE if the engine of the second vehicle UE is off.

General Apparatus to which an Embodiment of the Present Invention May be Applied FIG. 17 is a block diagram illustrating a wireless device in which methods as proposed herein may be implemented.

In this case, the wireless device may be a BS, UE, vehicle UE, a network entity, and the network entity includes at least one of eNB-type RSU or MME.

As shown in FIG. 17, the network entity 1710 and the UE (or the vehicle UE) 1720 include communication units (transmitting/receiving units, RF units, 1713 and 1723), processors 1711 and 1721, and memories 1712 and 1722.

The network entity and the UE may further input units and output units.

The communication units 1713 and 1723, the processors 1711 and 1721, the input units, the output units, and the memories 1712 and 1722 are operatively connected with each other in order to conduct the methods as proposed herein.

The communication units (transmitting/receiving units or RF units, 1713 and 1723), when receiving information created from a Physical Layer (PHY) protocol, transfer the received information through Radio Frequency (RF) spectrums and conduct filtering and amplification, then transmit the results through antennas.

Furthermore, the communication units transfer Radio Frequency (RF) signals received through the antennas to bands capable of being processed by the PHY protocol, and perform filtering.

However, the communication units may also include the functions of switches to switch transmitting and receiving functions.

The processors 1711 and 1721 implement functions, procedures, and/or methods as proposed herein. The layers of radio interface protocols may be implemented by the processors.

The processors may be represented as control parts, controllers, control units, or computers.

The memories 1712 and 1722 are connected with the processors to store protocols or parameters for tracking a location vehicle UE.

The processor may include an application-specific integrated circuit (ASIC), a separate chipset, a logic circuit, and/or a data processing unit. The memory may include read-only memory (ROM), random access memory (RAM), flash memory, memory cards, storage media and/or other equivalent storage devices. The RF unit may include a base-band circuit for processing a radio signal. When the embodiment of the present invention is implemented in software, the aforementioned methods may be implemented with a module (or a process or a function) for performing the aforementioned functions. The module may be stored in the memory and may be performed by the processor. The memory may be located inside or outside the processor, and may be coupled to the processor by using various well-known means.)

The output unit (display unit) is controlled by the processor and outputs information from the process, together with various information signals from the processor and key input signals generated from the key input unit.

Furthermore, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

Meanwhile, the tracking a location procedure as described herein may be implemented as processor-readable codes in a recording medium that may be read by a processor provided in a network device.

The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Furthermore, the recording media readable by the processor may be distributed to computer systems connected with each other via a network, and processor readable codes may be stored and executed in a distributing manner.

This disclosure lies in tracking a location procedure in a V2X communication system.

INDUSTRIAL APPLICABILITY

Examples in which the method for tracking a location using vehicle-to-X (V2X) communication in a wireless communication system according to an embodiment of the present invention has been applied to 3GPP LTE/LTE-A systems have been described, but the method may be applied to various wireless communication systems in addition to the 3GPP LTE/LTE-A systems.

The invention claimed is:

1. A method for tracking a location using vehicle-to-X (V2X) communication in a wireless communication system, the method performed by a second vehicle UE comprising:
   receiving a second message from a second network entity,
      wherein the second message comprises first control information related to a tracking of a location of the second vehicle UE,
      wherein the first control information comprises at least one of identification (ID) information of the second vehicle UE or tracking service indication information indicating whether a tracking service request is present or not;
   checking power availability of the second vehicle UE and service coverage,
      wherein the checking service coverage is related to whether the second vehicle UE is served by a cellular network;
   identifying its own ID included in the received second message; and
   transmitting a third message comprising second control information related to the location of the second vehicle UE to the second network entity when the second vehicle UE is served by the cellular network,
      wherein the transmission of the third message is continued by taking into consideration the power availability,
      wherein the second message is a paging message, and
      wherein, based on the second message is a paging message of a unicast type, the ID information of the second vehicle UE is an international mobile subscriber identity (IMSI) mapped to a vehicle identification number (VIN) of the second vehicle UE.

2. The method of claim 1, wherein the second control information comprises at least one of location information indicating a location coordinate of the second vehicle UE, time stamp information indicating a time when the location coordinate are obtained, or V2X accessory information.

3. The method of claim 1, further comprising storing the second control information if the second vehicle UE is not served by the cellular network.

4. The method of claim 1, further comprising receiving information indicating a storage of the second control information from the second network entity.

5. The method of claim 3, wherein the second control information is stored by taking into consideration a power availability of the second vehicle UE.

6. The method of claim 5, further comprising transmitting the stored second control information to the second network entity if the second vehicle UE enters the cellular network.

7. The method of claim 2, wherein the V2X accessory information comprises at least one of a fuel level of the second vehicle UE or a number of passengers of the second vehicle UE.

8. The method of claim 7, wherein the fuel level of the vehicle is combined with at least one of a trajectory of location information of the vehicle, speed of the vehicle, fuel efficiency of the vehicle, and future direction estimation of the vehicle.

9. The method of claim 1, wherein:
   the paging message comprises paging indication, and
   a resource region of the first control information is preset as a specific resource block (RB) within a fourth subframe after a subframe in which the paging indication is received.

10. The method of claim 9, wherein the specific RB is an RB #10.

11. The method of claim 1, wherein a third message is transmitted by V2X service-capable UE related to the second vehicle UE if an engine of the second vehicle UE is off.

12. The method of claim 1, wherein:
the second network entity is a network entity related to the second vehicle UE, and
the second network entity is an eNB-type road side unit (RSU) and a mobility management entity (MME).

13. A second vehicle UE for tracking a location using vehicle-to-X (V2X) communication in a wireless communication system, the second vehicle UE comprising:
a radio frequency (RF) unit for transceiving a radio signal; and
a processor functionally connected to the RF unit,
wherein the processor is configured to perform:
receiving a second message from a second network entity,
wherein the second message comprises first control information related to a tracking of a location of the second vehicle UE,
wherein the first control information comprises at least one of identification (ID) information of the second vehicle UE or tracking service indication information indicating whether a tracking service request is present or not;
checking power availability of the second vehicle UE and service coverage,
wherein the checking service coverage is related to whether the second vehicle UE is served by a cellular network;
identifying its own ID included in the received second message; and
transmitting a third message comprising second control information related to the location of the second vehicle UE to the second network entity when the second vehicle UE is served by the cellular network, wherein the transmission of the third message is continued by taking into consideration the power availability,
wherein the second message is a paging message, and
wherein, based on the second message is a paging message of a unicast type, the ID information of the second vehicle UE is an international mobile subscriber identity (IMSI) mapped to a vehicle identification number (VIN) of the second vehicle UE.

\* \* \* \* \*